United States Patent
Motoyama

(10) Patent No.: US 9,547,962 B2
(45) Date of Patent: Jan. 17, 2017

(54) SELECTING BEST-FIT DIGITAL LOCKERS FOR PACKAGES

(71) Applicant: Tetsuro Motoyama, Los Altos, CA (US)

(72) Inventor: Tetsuro Motoyama, Los Altos, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/339,383

(22) Filed: Jul. 23, 2014

(65) Prior Publication Data
US 2016/0027261 A1    Jan. 28, 2016

(51) Int. Cl.
| | |
|---|---|
| *G06Q 10/08* | (2012.01) |
| *G08B 5/36* | (2006.01) |
| *H04B 1/38* | (2015.01) |
| *G07F 17/12* | (2006.01) |
| *G06Q 10/04* | (2012.01) |

(52) U.S. Cl.
CPC ............. *G08B 5/36* (2013.01); *G06Q 10/04* (2013.01); *G06Q 10/0836* (2013.01); *G07F 17/12* (2013.01); *H04B 1/38* (2013.01)

(58) Field of Classification Search
CPC ............. G06Q 10/0836; G07F 17/12; A47G 2029/1228; G08B 5/36
See application file for complete search history.

(56) References Cited

U.S. PATENT DOCUMENTS

| | | | |
|---|---|---|---|
| 6,791,450 B2 * | 9/2004 | Gokcebay | G06Q 40/04 235/375 |
| 7,340,379 B2 | 3/2008 | Kunkel | |
| 8,150,656 B2 | 4/2012 | Kunkel | |
| 9,120,624 B1 * | 9/2015 | Cassady | B65G 1/137 |
| 2002/0113703 A1 | 8/2002 | Moskowitz | |

(Continued)

FOREIGN PATENT DOCUMENTS

JP        2007219742 A  *  8/2007

OTHER PUBLICATIONS

Machine Translation of JP2007219742.*

(Continued)

*Primary Examiner* — Brian Zimmerman
*Assistant Examiner* — Sara Samson
(74) *Attorney, Agent, or Firm* — Hickman Palermo Becker Bingham LLP; Malgorzata A. Kulczycka

(57) ABSTRACT

Techniques are provided for receiving a request to store an item at a locker facility; determining a first plurality of locker compartments that are available for storing items at a first locker facility; receiving data that indicates item-physical-dimensions of the item; determining whether, based at least in part on the item-physical dimension of the item and locker-physical-dimensions of each locker compartment from the first plurality of locker compartments that are available for storing items, one or more first locker compartments from the first plurality of locker compartments are available; and if so, selecting a first locker compartment from the one or more first locker compartments; determining a first locker identifier of the first locker compartment from the one or more first locker compartments; and generating and transmitting a first response message, which includes the first locker identifier of the first locker compartment.

20 Claims, 14 Drawing Sheets

(56) References Cited

U.S. PATENT DOCUMENTS

| | | |
|---|---|---|
| 2003/0134620 A1 | 7/2003 | Dutta |
| 2005/0253715 A1 | 11/2005 | Awobue |
| 2006/0095279 A1 | 5/2006 | Benco |
| 2012/0158606 A1 | 6/2012 | Moudy |
| 2012/0326840 A1* | 12/2012 | Frankenberg ........... G07F 17/12 340/5.65 |
| 2013/0144428 A1 | 6/2013 | Irwin et al. |
| 2013/0166067 A1* | 6/2013 | Irwin .................. B65G 1/0485 700/237 |
| 2013/0338822 A1 | 12/2013 | Gibson et al. |
| 2014/0278099 A1 | 9/2014 | Schenken |
| 2015/0186840 A1 | 7/2015 | Torres |
| 2015/0193733 A1* | 7/2015 | Bouzit-Benbernou A47G 29/141 705/332 |
| 2015/0371187 A1 | 12/2015 | Irwin |
| 2015/0371468 A1 | 12/2015 | Mackin |
| 2016/0025549 A1 | 1/2016 | Motoyama et al. |

OTHER PUBLICATIONS

European Patent Office Action, "Search Report" in application No. 15171452.4-1958, dated Sep. 23, 2015, 5 pages.
U.S. Appl. No. 14/339,386, filed Jul. 23, 2014, Notice of Allowance.
U.S. Appl. No. 14/339,386, filed Jul. 23, 2014, Corrected Notice of Allowability.

* cited by examiner

SELECTING BEST-FIT DIGITAL LOCKERS FOR PACKAGES

CROSS-REFERENCE TO RELATED APPLICATION

This application is related to U.S. patent application Ser. No. 14/339,386, titled "Digital Locker Delivery System," and filed Jul. 23, 2014, the entire contents of which are hereby incorporated by reference as if fully set forth herein.

FIELD OF THE DISCLOSURE

The present disclosure relates to a digital locker delivery system, and more specifically, to configuring a digital locker delivery system to manage a delivery of a package to a digital locker and to manage a retrieval of the package from the digital locker.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Digital lockers may be implemented as physical lockers equipped with circuitries configured to manage access to the lockers. Some digital lockers may be managed locally; other digital lockers may be managed centrally by a locker manager configured to communicate with the lockers.

Digital lockers may serve a vast range of industries, including airports, train stations, sports facilities, schools, universities, factories, businesses and the like. For example, a section of industrial lockers may be configured as a permanent fixture in a school, an office, a gym or a factory.

Digital lockers may be manufactured to suit a variety of needs, and may be available in a wide range of shapes and sizes. The locker may be available as single compartment lockers, multi-compartment lockers, and the like.

Some digital lockers are equipped with light sensors that are used to determine whether any objects are present inside the lockers. Unfortunately, the readings from the light sensors may be inaccurate. For example, in situations when a light sensor is obscured by dust or dirt, the reading from the sensor may indicate that some object is present in the locker even if the locker is empty.

SUMMARY

Techniques are provided for receiving a request to store an item at a locker facility; determining a first plurality of locker compartments that are available for storing items at a first locker facility, wherein each locker compartment, from the first plurality of locker compartments that are available for storing items at the first locker facility, has locker-physical-dimensions; receiving data that indicates item-physical-dimensions of the item; and determining whether, based at least in part on the item-physical dimension of the item and the locker-physical-dimensions of each locker compartment from the first plurality of locker compartments that are available for storing items, one or more first locker compartments from the first plurality of locker compartments that are available for storing items have locker-physical-dimensions that are the same as or greater than the item-physical dimensions of the item.

In response to determining, based at least in part on the item-physical dimension of the item and the locker-physical-dimensions of each locker compartment from the first plurality of locker compartments that are available for storing items, that one or more first locker compartments have first locker-physical-dimensions that are the same as or greater than the item-physical dimensions of the item: a first locker compartment from the one or more first locker compartments that have locker-physical-dimensions that are the same as or greater than the item-physical dimensions of the item is selected. Furthermore, a first locker identifier of the first locker compartment from the one or more first locker compartments that have first locker-physical-dimensions that are the same as or greater than the item-physical dimensions of the item is determined. Moreover, a first response message, which includes the first locker identifier of the first locker compartment, is generated and transmitted.

In an embodiment, the method is performed using one or more computing devices.

DETAILED DESCRIPTION

Figure 1:
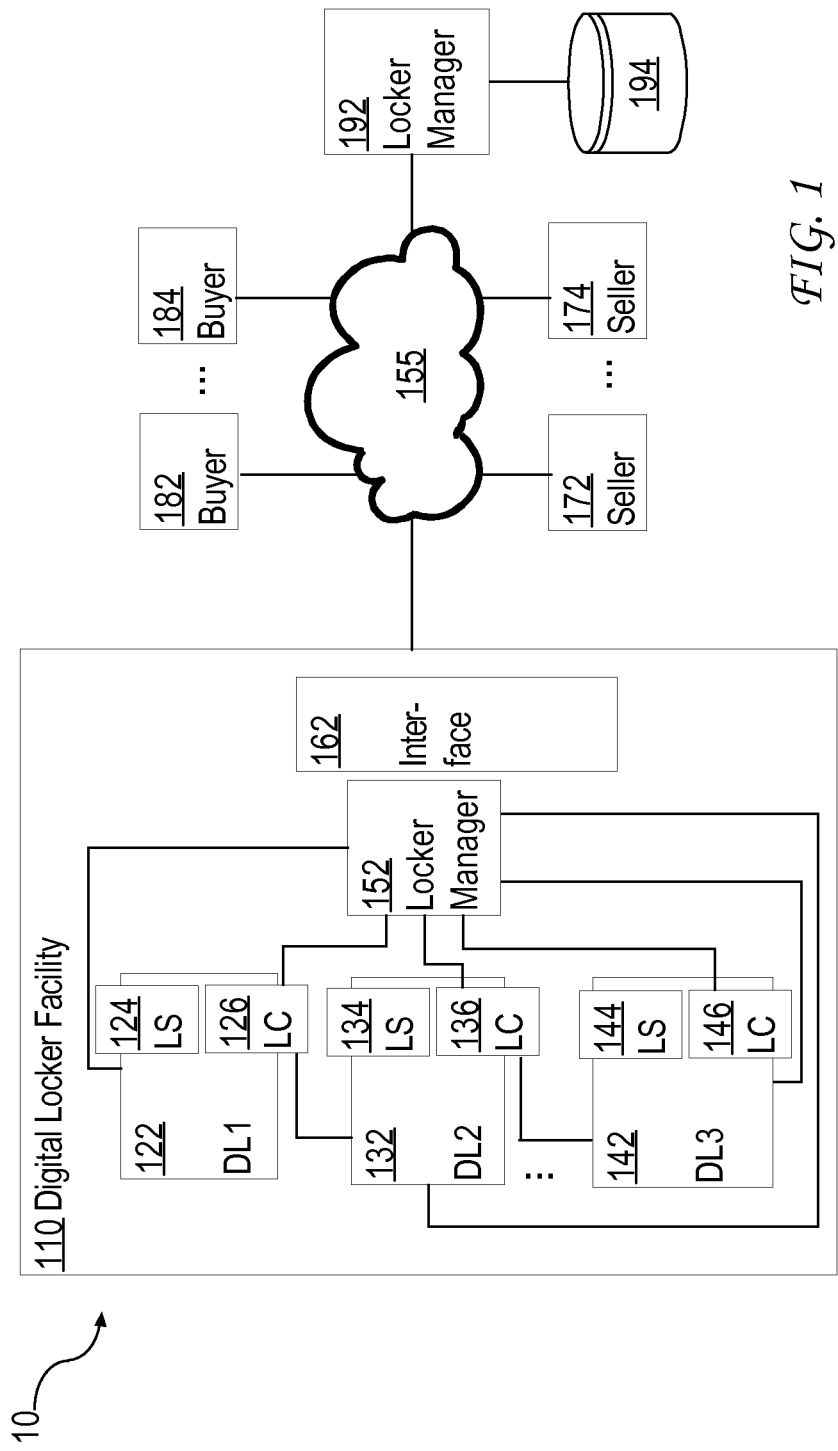
FIG. 1 is a block diagram that depicts an example architecture of a digital locker delivery system.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

1.0 OVERVIEW
2.0 SYSTEM ARCHITECTURE
2.1 SINGLE-FACILITY DIGITAL LOCKERS
2.2 MULTIPLE-FACILITY DIGITAL LOCKERS 2.3 DIGITAL LOCKERS WITH SIMILAR COMPARTMENTS
2.4 DIGITAL LOCKERS WITH DIFFERENT COMPARTMENTS
2.5 DIGITAL LOCKER DELIVERY SYSTEM
3.0 EXAMPLES OF DIGITAL LOCKERS
4.0 IDENTIFYING THE BEST-FIT-LOCKER FOR A PACKAGE
5.0 DELIVERING A PACKAGE TO A DIGITAL LOCKER
  5.1 FLOW CHART
  5.2 TIME CHART
6.0 WEIGHT-BASED-VERIFICATION OF A PACKAGE DELIVERY
  6.1 FLOW CHART
  6.2 TIME CHART
7.0 WEIGHT-BASED-VERIFICATION OF RETRIEVING OF A PACKAGE
8.0 WEIGHT-BASED-MANAGEMENT OF A LOCKER USAGE
9.0 RETRIEVING PACKAGE FROM A DIGITAL LOCKER
  9.1 FLOW CHART
  9.2 TIME CHART
10.0 IMPLEMENTATION MECHANISM 1.0 Overview An approach is provided for managing a delivery of a package to a digital locker and for managing a retrieval of the package from the digital locker. In an embodiment, managing of a package delivery and package retrieval is performed by various components of a digital locker system. The components of the digital locker system may cooperate with each other, with other devices and computers, and with users.

In an embodiment, a digital locker system utilizes a variety of tools, including tools for measuring and weighing the packages. The tools may include weight sensors, light sensors, infra-red sensors, optical sensors, magnetic sensors, and the like. The sensors may be used to determine various characteristics of a package, such as physical dimensions of a package, a weight of the package, a color of the wrapping of the package, an appearance of the package, and the like.

Measuring and weighing tools may collect characteristics of a package, and the characteristics may be used to determine whether the package was deposited in a digital locker, whether a correct package was deposited in the locker, whether the package was retrieved from the locker, and the like, or any combination thereof.

Measuring and weighing tools may be implemented in both a package-handler and a digital locker. For example, one measurement system may be implemented in an entity handling a delivery of the package, and another measurement system may be implemented in a digital locker to which the package may be delivered. The measurement system of the entity handling the delivery of the package may be configured to determine a weight of the package before the package is dispatched to a carrier. The measurement system of the digital locker may be configured to determine a weight of an item that has been delivered to a locker compartment of the digital locker. As used herein, the term "locker compartment" refers to a physical space associated with a digital locker. A digital locker may include a single locker compartment or multiple locker compartments, depending upon a particular implementation.

In an embodiment, various readings of the weight of the package may be compared to determine whether the package was deposited in a locker compartment. For example, the weight of the package determined by a measurement system associated with the entity handling the delivery of the package may be compared with the weight of the package determined by the measurement system associated with the digital locker. If the weights match within a certain error margin, then the digital locker may determine that the item present in the locker compartment is indeed the same package.

Various readings provided by a digital locker may also be used to determine whether a package was deposited in a locker compartment, and/or whether a package was retrieved from a locker compartment. For example, if the weight-readings change from about zero to the weight above a certain weight threshold, then the digital locker may determine that an item has been deposited in the locker compartment. However, if the weight-readings change from the weight above a certain weight threshold to zero (within a certain threshold), then the digital locker may determine that the item has been removed (or retrieved) from the locker compartment.

Weight readings may also be used to determine a time period during which a package remains in a locker compartment and/or to determine whether the package remains in a locker compartment longer than it is expected. For example, if a weight of an item deposited in a locker compartment remains above a certain weight threshold for several days, and does not change within the several days by more than 10% of the initial weight of the package, then a digital locker delivery system may generate a message indicating that the package has not been timely retrieved from the compartment. The message may be used to urge a recipient of the package to retrieve the package from the locker.

However, if a package remains in a locker compartment less than a certain time period, then a sender and/or a recipient of the package may be awarded for using the compartment for a short period of time, and thus increasing the usage-efficiency of the digital locker delivery system.

Weight readings may also be used to identify a locker compartments that is empty and available for use. For example, if a weight of the contents of the locker compartment remains below a certain weight threshold, then a digital locker delivery system may generate a message indicating that the locker compartment is empty, and thus available to customers.

In an embodiment, a digital locker delivery system identifies the best-fit locker compartment for a package. The determination may be based on a variety of factors, including the size of the package, the popularity of the locker compartments, the demand of the locker compartments, the availability of the locker compartments, and the like. For example, upon receiving a request to store a particular package, a digital locker delivery system may obtain the measurements of the package.

Measurements of a package may be obtained using a variety of measuring tools, such as optical sensors, electromagnetic sensors, mechanical sensors, and the like. The measurements may include dimensional measurement, such as height, width, and depth of the package, the weight of the package, or any other measurements that allow determining the size and/or characteristics of the package.

The digital locker delivery system may also obtain measurements of the lockers that are empty and available. The measurements may be provided to the digital locker delivery system by digital lockers, by a maintenance service of the digital lockers, or otherwise.

Based on the measurements of the package and the measurements of the locker compartments that are empty at the moment, a digital locker delivery system may determine whether any of the available locker compartments is large enough to hold the package. If more than one locker compartments are identified as large enough to hold the package, then the digital locker delivery system may select a particular locker compartment that is large enough to hold the package, but that is also the smallest from all the locker compartments that could hold the package. This approach is referred herein as finding the best-fit-locker for the package.

Throughout this description, the terms a sender and a seller are used interchangeably. The terms a recipient and a buyer are also used interchangeably.

2.0 System Architecture

2.1 Single-Facility Digital Lockers

FIG. 1 is a block diagram that depicts example architecture of a digital locker delivery system 10. Throughout the disclosure, digital locker delivery system 10 may also be referred to as a delivery system 10. Both names are used interchangeably herein.

In the depicted example, delivery system 10 comprises a digital locker facility 110, which may be implemented in a commercial building at an airport, a train station, a factory, or any other enterprise.

Digital locker delivery system 10 may be configured allow lockers in a digital locker facility 110 to communicate, via one or more computer networks 155, with one or more sellers 172, 174, and one or more buyers 182, 184. In an embodiment, delivery system 10 also includes a locker manager 192, which uses one or more databases 194, and which communicates with digital locker facility 110. Locker manager 192 and/or databases 194 may be used to manage digital lockers of digital locker facility 110. In some implementations, locker manager 192 and/or databases 194 are optional.

Digital locker facility 110 may include various digital lockers and facilitate communications between the lockers, sellers 172, 174 and buyers 182, 184. For example, digital locker facility 110 may include a system of digital lockers and make the digital lockers available to sellers 172, 174 and buyers 182, 184.

In an embodiment, digital locker facility 110 comprises one or more digital lockers 122, 132, 142, each of which communicates with its own locker sensors and locker controllers. For example, a digital locker 122 may communicate with a locker sensor (LS) 124 and a locker controller (LC) 126; a digital locker 132 may communicate with a locker sensor 134 and a locker controller 136; and a digital locker 142 may communicate with a locker sensor 144 and a locker controller 146. A one-to-one relationship between locker controllers and digital lockers is not required and a single locker controller may control more than one digital locker, depending upon a particular implementation.

In an embodiment, locker sensor 124 and locker controller 126 are part of a locker compartment. Similarly, locker sensor 134 and locker controller 136 are part of a locker compartment. Also, locker sensor 144 and locker controller 146 are part of a locker compartment. Other organization of locker compartments and digital lockers may also be implemented.

Digital locker 122 (132, 142) may be a programmable unit equipped with CPUs, memory units, other components and computer software, and may be configured to monitor and control access to a locker compartment of the digital locker.

Locker sensor 124 (134, 144) may be a programmable unit implementing one or more optical sensors, magnetics sensors, weight sensor, and the like. Locker sensor 124 (134, 144) may be configured to determine a size, a weight, an appearance and other characteristics of an item deposited in a locker compartment.

Locker controller 126 (136, 146) may be a programmable unit configured to control access to a locker compartment, transmit sensor information from locker sensor 124 (134, 144) to other components of digital locker 122 (132, 142), receive instructions from other units, and perform other operations.

In an embodiment, digital lockers 122, 132, 142 communicate with other digital lockers. For example, digital locker 132 may communicate not only with its own locker sensor 134 and locker controller 136, but also with locker controller 126, which is a part of digital locker 122. Similarly, digital locker 142 may communicate not only with its own locker sensor 144 and locker controller 146, but also with locker controller 136, which is a part of digital locker 132. Other communications connections, not necessarily depicted in FIG. 1, may also be implemented.

In an embodiment, digital locker delivery system 10 comprises a locker manager 152. In situations when each of digital lockers 122, 132, 142 manage themselves and cooperate with each other, locker manager 152 may be optional. However, if digital lockers 122, 132, 142 are not configured to manage the delivery of packages, locker manager 152 may be used to centrally manage the digital lockers.

Locker manager 152 may be configured to manage digital lockers 122, 132, 142 and communicate instructions and messages between digital lockers 122, 132, 142, and sellers 172, 174, and buyers 182, 184. For example, locker manager 152 may be configured to determine whether any locker compartments, associated with digital lockers 122, 132, 142, are empty. Locker manager 152 may also be configured to determine which locker compartment, associated with digital lockers 122, 132, 142, is the most suitable to hold a particular package.

Locker manager 152 may communicate with network 155 via an interface 162. Interface 162 may be implemented as any data input/output interface. For example, interface 162 may be implemented as a graphical user interface, or any other type of the programmable interface configured to handle input/output transactions.

Network 155 may be any type of a communications network configured to facilitate communications between users, devices and systems. Network 155 may be a local area network, a wide area network, or a combination of both.

Sellers 172, 174 represent user computers that individuals, such as merchants, sellers or senders, may use to communicate with buyers 182, 184, and digital locker facility 110. For example, sellers' computers 172, 174 may be used to process purchase transactions, lease or rent a digital locker, request storing a package in a digital locker, monitor delivery of a package to a locker compartment, monitor retrieving of a package from a locker compartment, and the like.

This may be illustrated using the following example: suppose that a seller who sells CD albums online uses seller computer 172 to advertise the CD albums to potential buyers 182, 184. Upon receiving a purchase order for a particular CD album, the seller may use seller computer 172 to process a purchase transaction, make arrangements for a package containing the CD album to be delivered to a particular locker compartment in digital locker facility 110, and monitor the locker compartment to determine whether the package containing the CD album was picked up by a buyer.

Buyers 182, 184 represent user computers that individuals, such as buyers or recipients, may use to communicate with sellers 172, 174, and digital locker facility 110. For example, buyers' computers 182, 184 may be used to view websites and shopping networks, initiate purchase transactions from the websites, monitor a delivery of purchased items, receive messages indicating whether the purchased items have been deposited in a locker compartments, and the like.

This may be illustrated using the following example: suppose that a buyer used a browser launched on buyer's computer 182 to purchase online a pair of tickets to a concert. Once the purchase transaction is completed, the buyer may receive a purchase-confirmation message. The message may include a physical address of the digital locker facility 110 and an access code for a particular digital locker compartment, in which the pair of tickets will be delivered to be picked up. Later on, once the buyer receives a message that the pair of tickets has been deposited in a locker compartment of the digital locker having the particular access code for the locker, the buyer may go to the digital locker facility 110 and retrieve the pair of tickets from the compartment.

Storage 194 may be any combination of volatile or non-volatile storage configured to store data 02. For example, storage 194 may be random access memory (RAM), one or more disks, or any combination of RAM and one or more disks for storing scanned document data. Storage 194 may be used to store information about digital lockers, communications exchanged between the digital lockers, sellers, buyers and a locker manager, For example, storage 194 may be used to store information about the locker compartments that are empty, the locker compartments that are used to store items, the requests for locker compartments, and the like.

2.2. Multiple-Facility Digital Lockers

Figure 2:
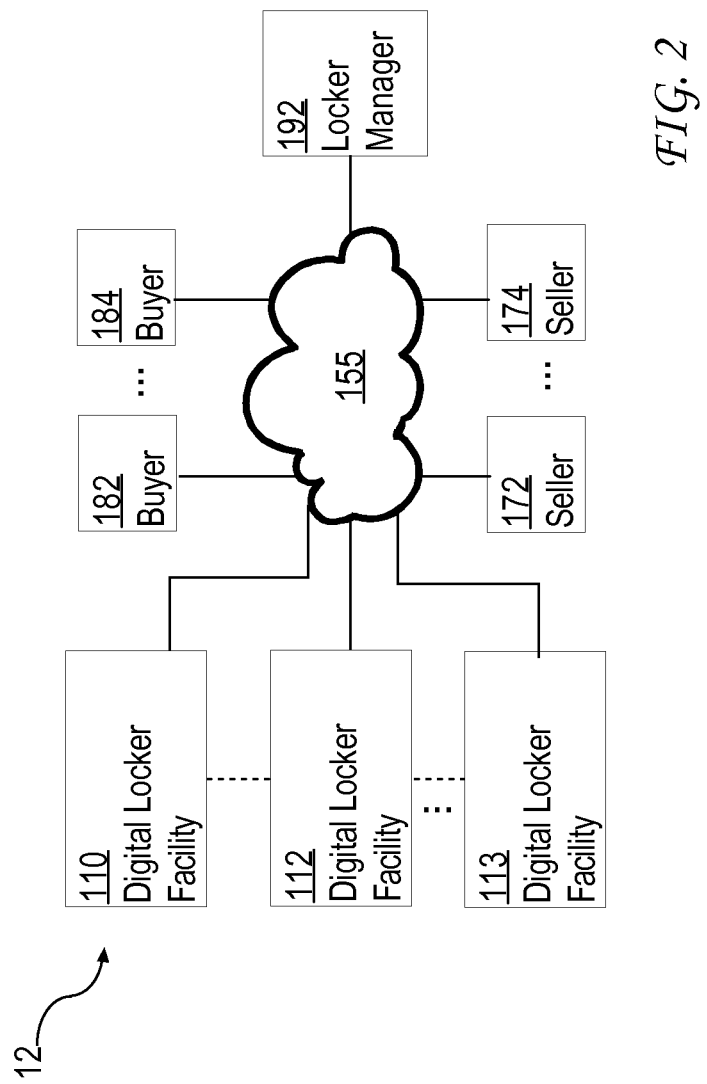
FIG. 2 is a block diagram that depicts an example architecture of a digital locker delivery system.

FIG. 2 is a block diagram that depicts example architecture of a digital locker delivery system 12. In an embodiment, digital locker delivery system 12 comprises one or more digital locker facilities 110, 112, 113, that communicate via a network 155 with a locker manager 192, sellers 172, 174 and buyers 182, 184. Each of digital locker facilities 110, 112, 113 may correspond to a digital locker facility 110, described in FIG. 1. Network 155, sellers 172, 174, and buyers 182, 184 were also described in FIG. 1.

In an embodiment, digital lockers configured in digital locker facilities 110, 112, 113 communicate with each other and with a locker manager 192. For example, digital lockers of digital locker facilities 110, 112, 113 may exchange information about availability of locker compartments, useability of the lockers, requests for the lockers, and various types of messages and notifications. Further, the digital lockers may receive requests and instructions from locker manager 192.

Locker manager 192 may be configured to centrally manage digital locker configured in digital locker facilities 119, 112, 113. For example, locker manager 192 may query the digital lockers for the availability information of the locker compartments, and use that information to select a particular locker compartment in one of digital locker facilities 110, 112, 113 that is the most suitable for storing a particular package. This may be illustrated using the following example: suppose a seller requests a digital locker for storing a particular package. The request may include specification of the size and/or weight of the package. Alternatively, the size and/or weight of the package may be determined by locker manager 192. The request for a digital locker may be sent to locker manager 192. Upon receiving the request, locker manager 192 may parse the request and extract from the request the size-specification of the package. Alternatively, locker manager 192 may query the seller to provide the size-specification for the package, or obtain the size-specification from a third-party.

Upon receiving the size-specification of the package, locker manager 192 may transmit the specification to digital locker facility 110 to determine whether digital locker facility 110 has a locker compartment that is large enough to hold the package. In response, locker manager 192 may receive one or more responses from the digital lockers implemented in digital locker facility 110. If the digital lockers implemented in digital locker facility 110 do not have a locker compartment large enough to hold the package, then locker manager 192 may query the next digital locker facility, such as digital locker facility 112, and so for. Alternatively, locker manager 192 may query all the digital lockers in all available digital locker facilities 110, 112, 113 simultaneously.

Upon receiving responses from the digital lockers, locker manager 192 may determine whether a locker compartment that is large enough to hold the package is available. If such a locker compartment is available, then locker manager 192 may collect the identification information of the locker compartment, and transmit the information to the seller. Although embodiments are depicted in the figures and described herein in the context of using a single lock manager for purposes of explanation, embodiments are not limited to implementations with a single lock manager and any number of lock managers may be used, depending upon a particular implementation. For example, multiple lock managers may be used for redundancy and load balancing.

2.1 Digital Lockers

Figure 3:
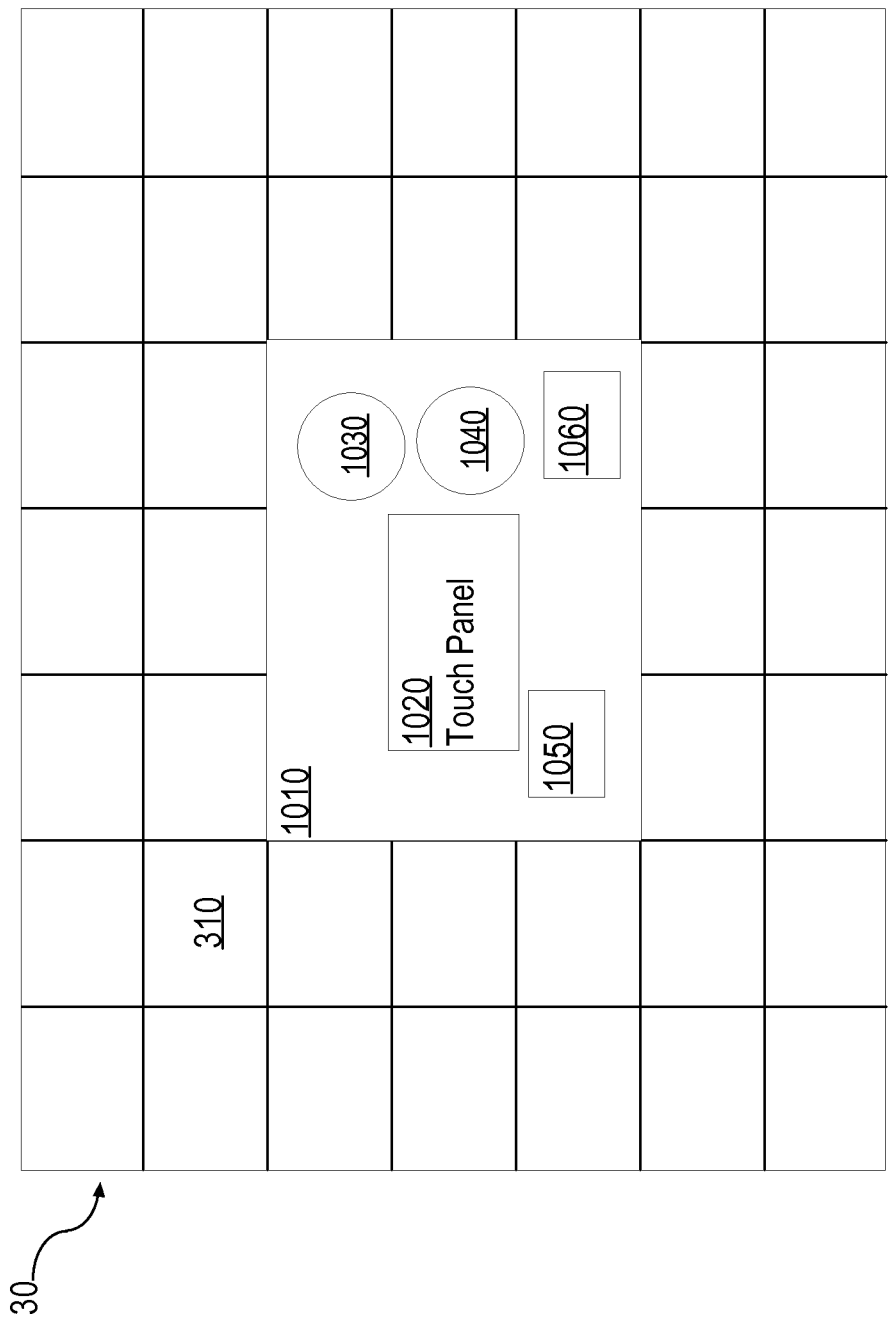
FIG. 3 is a block diagram that depicts an example digital locker.
Figure 4:
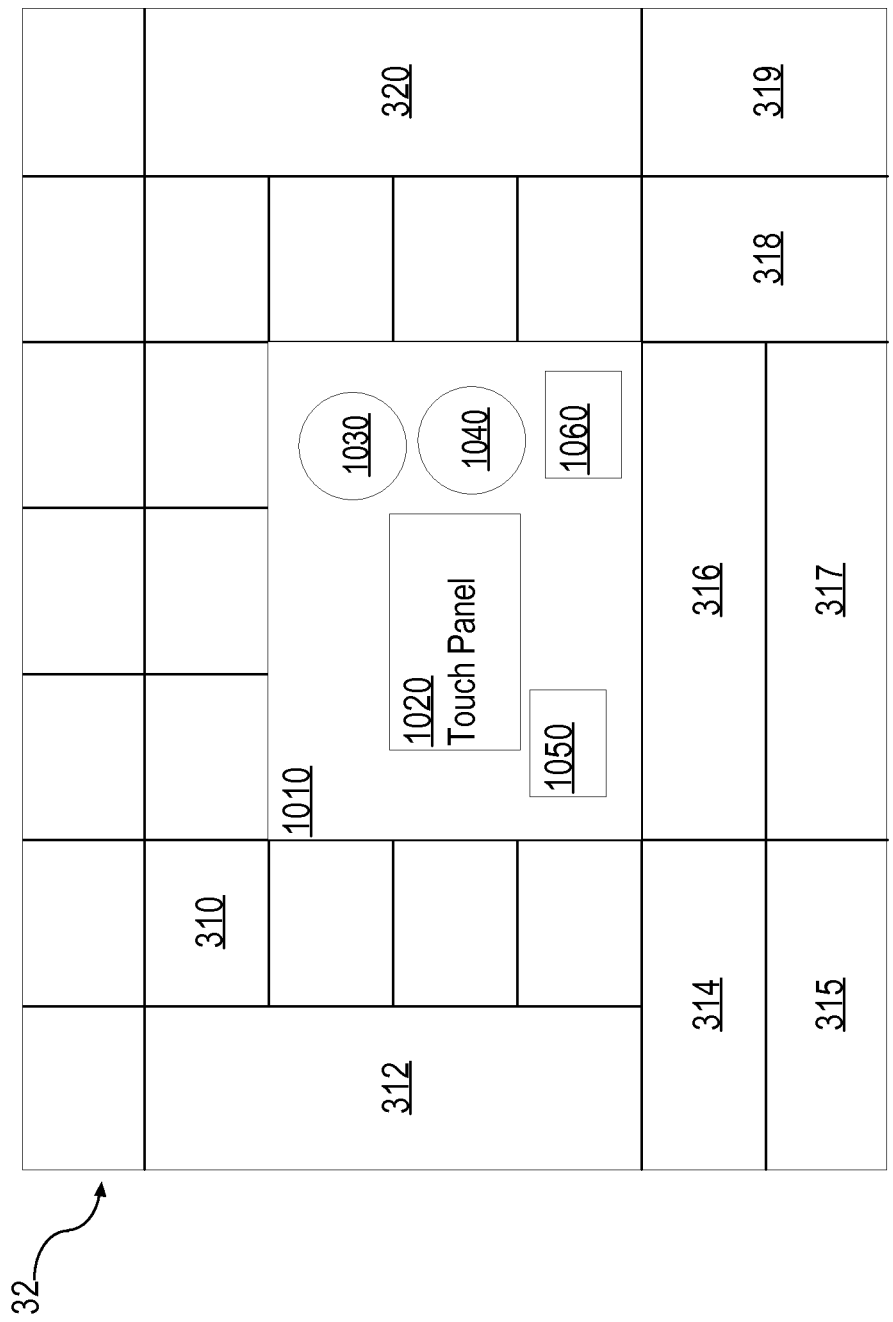
FIG. 4 is a block diagram that depicts an example digital locker.

FIGS. 3-4 depict examples of digital lockers. In the example depicted in FIG. 3 locker compartments of all illustrated lockers have the same size, while in the example depicted in FIG. 3 illustrates locker compartments have different sizes.

2.3 Digital Lockers with Similar Compartments

FIG. 3 is a block diagram that depicts an example digital locker 30. The depicted example includes an interface portion 1010 and a plurality of locker compartments located and mounted around the interface portion 1010. Depending on implementation, digital locker 30 may include only one interface portion 1010 (as depicted in FIG. 3), or may include a plurality of interface portions 1010. Each interface portion 1010 may include various displays, controls and data entry sub-interfaces.

In an embodiment, interface portion 1010 comprises one or more touch panels 1020, one or more sensors 1030, 1040, and one or more controls 1050, 1060.

Touch panel 1020 may be configured to receive data from a user, and display information for the user. For example, touch panel 1020 may be configured to display a menu containing various options that a user may choose to initiate entering data to digital locker 30. A menu may include displays of various screens containing one or more options that the user may select by touching the option-label, displayed in touch panel 1020. For example, upon touching touch panel 1020, a main menu having one or more options may be displayed in touch screen 1020; once a user selects (or touches) a particular option from the one or more options displayed in touch screen 1020, another menu may be displayed in touch screen 1020.

Menu options displayed in touch panel 1020 may allow a user to enter identification data of the user, identification data of a locker compartment, access code for a locker compartment, and the like. For example, a user may enter his login information, such as his name or a login name. Then, the user may enter his password. Upon receiving the login information and the password from the user, digital locker 30 may attempt to authenticate the user to digital locker 30, and if the credentials provided by the user are valid, the user may be prompted to enter an identifier of a locker compartment, which the user would like to use. Upon receiving the identifier of the locker compartment, the user may be prompted to enter an access code for the compartment. If the user enters a valid access code, then the locker compartment associated with the entered identifier may be opened for the user.

Sensors 1030, 1040 may include optical sensors, scanners, cameras, infra-red sensors, finger-papillary-lines readers, eye-iris-code reader, Quick-Response (QR) code readers, bar-code readers, and the like. The sensors may be configured to collect information from users, objects positioned in front of the sensors, or objects placed inside locker compartments.

A Quick Response (QR) code is a two dimensional code for representing data in a graphical form. In a QR code, data is encoded to strings containing ones and zeroes, and the strings are represented graphically as rows and columns containing black and white pixels. For example, a QR code may utilize a two-dimensional array of pixels, wherein each pixel can have associated one of two Boolean values. For example, if a particular pixel has associated the Boolean value of "1," then the pixel is filled with a black rectangle. However, if a particular pixel has associated the Boolean value of "0," then the pixel is filled with a white rectangle. Using the coding, the rows and columns of the two-dimensional array are filled with black and white rectangles, and groups of the pixels are interpreted as the encoded data. Other combinations of associations between the Boolean values and colors of the rectangles may be used.

In other embodiments, encoded data may be in the form of a bar code, in which data are encoded to a string containing ones and zeroes, and the strings are represented graphically as a row of black and white bars. The encoded data can also be represented by one or more symbols, one or more alphanumeric characters, or any other form of coding.

Some of sensors 1030, 1040 may be installed inside locker compartments, and may be used to determine whether any object is present in a locker compartment. For example, some of sensors 1030, 1040 may be optical sensors, which detect the light intensity and the light color. Based on the detected light values, optical sensors determine whether a locker compartment is open, whether an object is placed in a locker compartment, whether an object is removed from a locker compartment, and the like.

Some of sensors 1030, 1040, installed inside locker compartments, may be used to determine a weight of an object placed in a locker compartment. For example, some of sensors 1030, 1040 may be implemented as electronics or mechanical scales and provide readings of the items placed in a locker compartment. If the scale is calibrated when a locker compartment is empty, then the scale sensor can provide a new reading when an object (having some non-null-weight) is placed in the locker compartment. Then, if the object is removed from the locker compartment, then the scale sensor can provide another reading indicating that the object was removed from the compartment.

In an embodiment, some of sensors 1030, 1040 are used to collect data from a user and/or from items held by the user in front of the sensors. For example, if the collected data includes depictions of the user, then the collected data may be used to authenticate the user. If the collected data was scanned from a badge of a user, then the collected data may be used to authenticate the user. However, if the collected data includes QR code information collected from a mailing slip or a mailing label, then the collected data may be used to identify a package, a letter or other item. If the collected data includes bar-code data collected from a package slip or other type of printed code, then the collected data may be used to identify a locker in which the package is to be deposited, or a locker from which the package is to be retrieved. For example, if a user entered an identifier of a locker compartment 310 and a valid access code for locker compartment 310, then digital locker 30 may initiate opening of locker compartment 310.

Sensors 1030, 1040 may also collect other types of information useful in identifying a user, a package, a mailing document, and the like. For example, sensors 1030 may be used to monitor surroundings of digital locker 30 using cameras and other visual data collecting devices.

Controls 1050, 1060 may be configured to allow a user to navigate menus displayed in touch panel 1020, select options displayed in touch panel 102, enter data to digital locker, and the like. For example, one of controls 1050, 1060 may be used to display a menu in touch panel 1020, while another control may be used to navigate within the displayed menu, select options from the displayed menu, and so forth.

Interface portion 1010 may also include other components, not depicted in FIG. 3. For example, interface portion 1010 may include various dials, LED displays, cameras, face recognition interfaces, finger papillary-lines recognition devices, and the like. The dials may be electronically or mechanically operated, and may be used to enter locker-identifiers and locker access codes. Finger-papillary-lines recognition devices may be used to authenticate a user based on the unique distribution of the papillary lines on the user's finger.

2.4 Digital Lockers with Different Compartments

FIG. 4 is a block diagram that depicts an example digital locker 32. In contrast to the example digital locker depicted in FIG. 3, the locker depicted in FIG. 4 includes locker compartments that vary in sizes. For example, digital locker 32 may include small compartments 310, medium size compartments 314, 315, 318, 319, and large compartments 312, 316, 317 and 320. Lockers 314, 315, 318, 319 are larger than locker compartment 310, but smaller than locker compartments 312, 316, 317, 320. Furthermore, locker compartments 312, 320 appear to be suitable for storing items that are rather tall, or at least taller than items suitable for storing in locker compartments 310, 318, 310. Moreover, locker compartments 316, 317 appear to be suitable for storing items that are rather wide, or at least wider than items suitable for storing in locker compartments 310, 312, 320, 314, 315, 318, 319.

One of the advantages of including locker compartments having various sizes is the ability to utilize the lockers more efficiently than if the locker compartments were the same size. For example, if all the locker compartments in a particular digital locker are the same size, then items are stored in the locker compartments as long as they fit into the compartment. Hence, some of the locker compartment space may be unused; especially if the items are small, such as letters or pamphlets. Some of the locker compartment space may also be unused if the items to be stored are too small to hold such items.

However, when digital locker 32 contains locker compartments of different sizes, then locker compartments may be selected for a package using the best-approach. Using the "best-fit" approach for determining a locker compartment suitable for storing an item may improve efficiency in using the storage space.

In an embodiment, digital locker 32 includes an interface portion 1010 and a plurality of locker compartments located and mounted around the interface portion 1010. Depending on implementation, digital locker 32 may include only one interface portion 1010 (as depicted in FIG. 4), or may include a plurality of interface portions 1010 (not depicted in FIG. 4). Each interface portion 1010 may include various displays, controls and data entry sub-interfaces. Touch panel 1020, sensors 1030, 1040, and controls 1050, 1060 are described in FIG. 3. Although embodiments are depicted in the figures and described herein in the context of square or rectangular-shaped digital lockers for purposes of explanation, embodiments are applicable to digital lockers of any shape, e.g., polygon-shaped, round and/or curved digital lockers.

2.5 Digital Locker Delivery System

Figure 5:
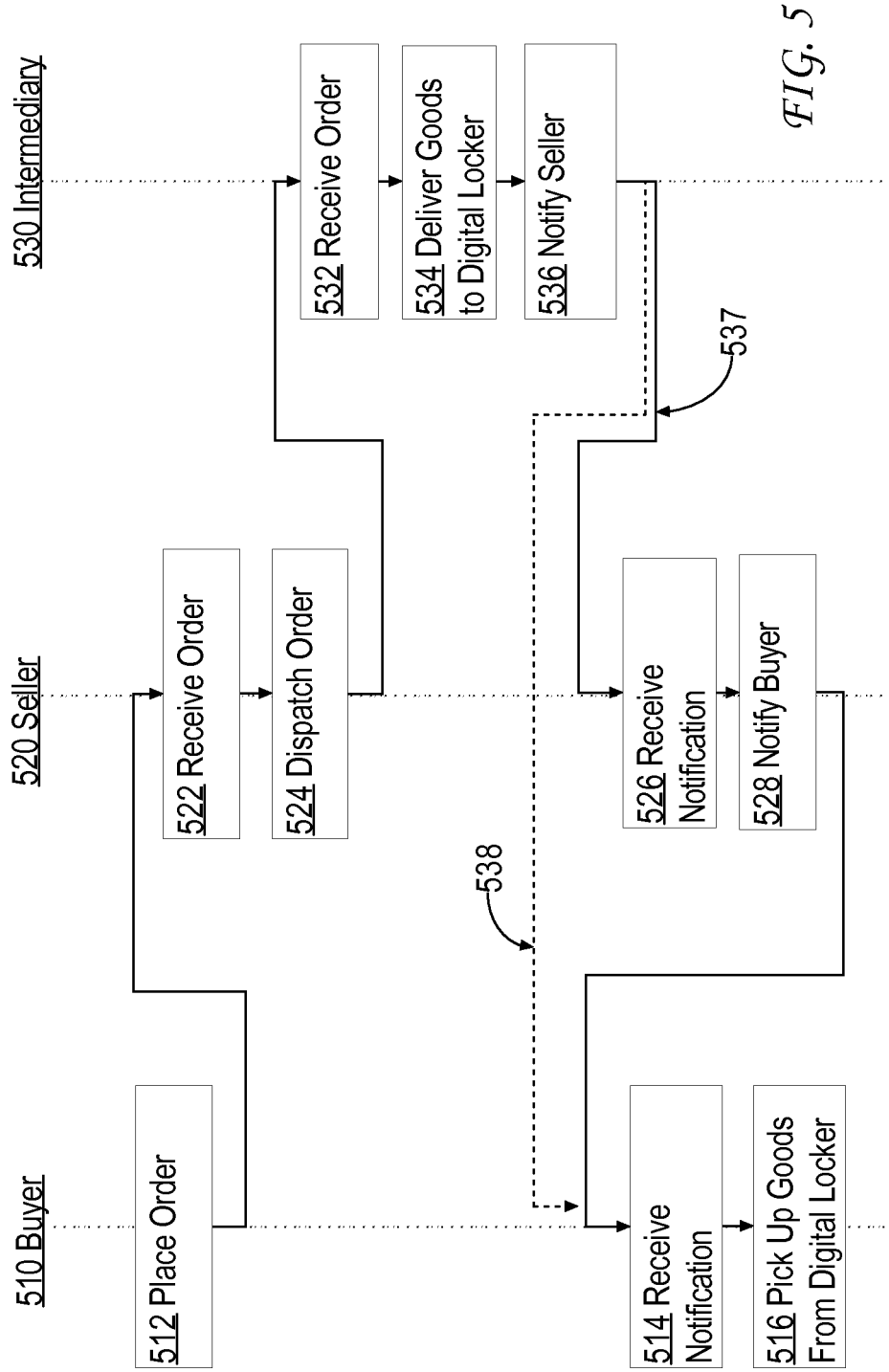
FIG. 5 is a flow diagram that depicts communications exchanged between a buyer, a seller and an intermediary.

FIG. 5 is a flow diagram that depicts communications exchanged between a buyer 510, a seller 520 and an intermediary 530. In an embodiment, an intermediary 530 is a company that provides shipping and logistics services. Intermediary 530 may be a package delivery company, a document delivery company, a courier-delivery-service company, an international express mail delivery company, an air-mail delivery company, and the like. Some examples of intermediary 530 may include United Parcel Service (UPS), FedEx, DHL, and others.

In an embodiment, an intermediary 530 is an electronic commerce company and/or online retailer operating online shopping networks or conducting business over the Internet. Examples of such companies may include Amazon.com, eBay.com, and others.

The depicted diagram illustrates an example scenario in which a buyer 510 places an order for an item offered by a seller 520; seller 520 cooperates with an intermediary 530 in delivering the ordered item to a digital locker; and buyer 510 retrieves the ordered item from the digital locker.

Figure 7:
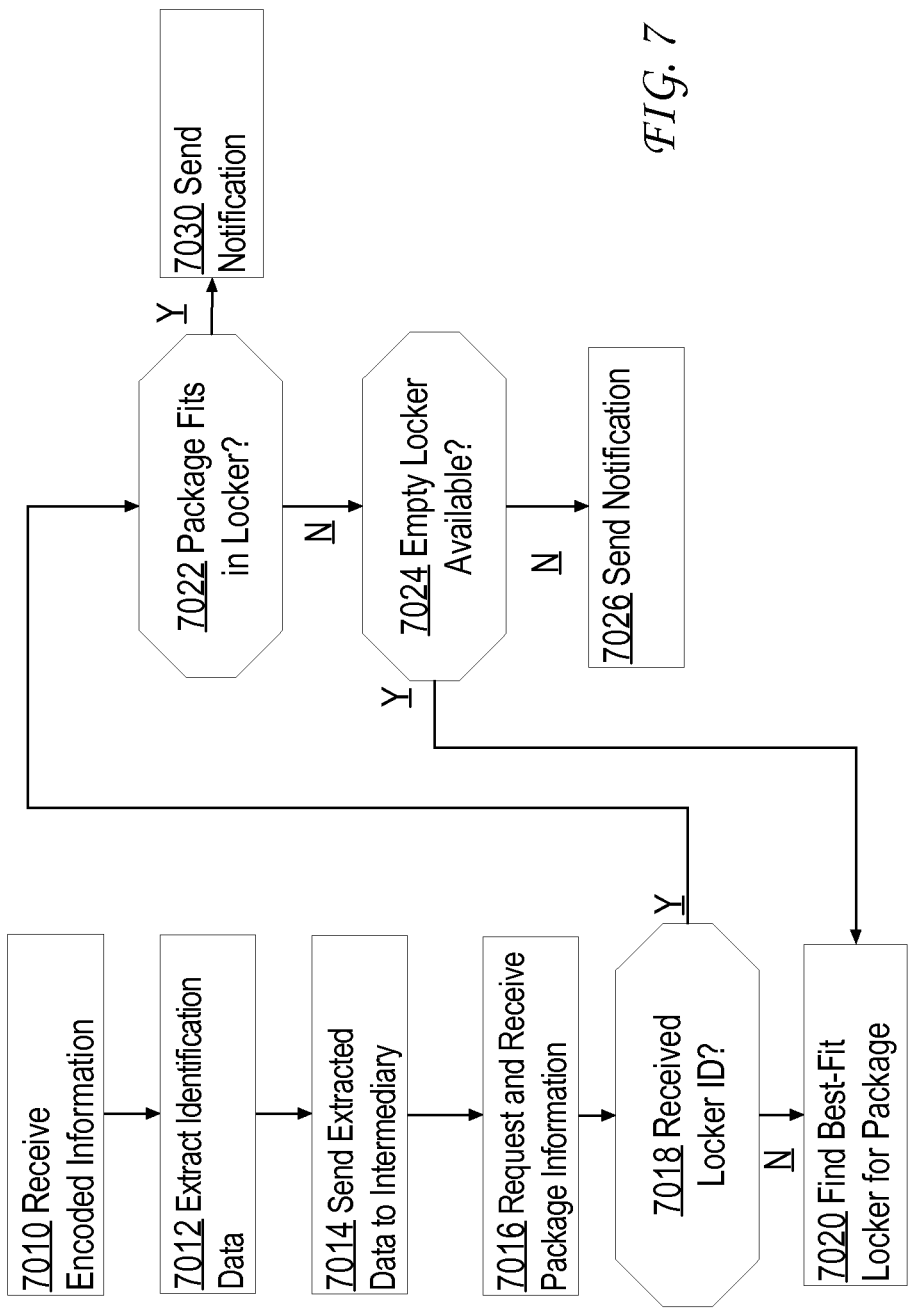
FIG. 7 is a block diagram that depicts a process of identifying a best-fit locker for a package.

In this scenario, it is assumed that seller 520 or intermediary 530 have already determined the best-fit locker compartment for storing the item. For example, it is possible that seller 520 owns and/or uses a particular locker compartment, and seller 520 has been using the particular locker compartment for shipping all his packages. Alternatively, the system may find the best-fit locker for each package that seller 520 sends to his customers. One approach for finding the best-fit locker is depicted in FIG. 7.

Referring again to FIG. 5, in step 512, buyer 510 places an order for an item offered by seller 520. Upon receiving the order in step 522, seller 520 proceeds to dispatching the order to intermediary 530.

Intermediary 530 may be any entity involved in the delivery of ordered items. For example, intermediary 530 may be a carrier or a shipping company that employs carriers or package delivery contractors. In some cases, intermediary 530 may be UPS, FedEx, DHL, or other package-delivery company.

Upon receiving the order in step 532, intermediary 530 may, in step 534, make arrangements for delivering the ordered goods to a digital locker. The digital locker may be already identified in the received order. Alternatively, intermediary 530 may select the digital locker using the information included in the received order. For example, intermediary 530 may check whether seller 520 already owns or indicated the locker in the order. Also, intermediary 530 may contact a digital locker delivery system to determine whether any locker compartments that is large enough to hold the ordered item is available. Furthermore, intermediary 530 may send a request to a carrier to make arrangements for a locker compartment.

In an embodiment, intermediary 530 (or seller 520, or any other entity) determines a digital locker for storing the ordered items. For example, if seller 520 provides size-dimensions of the package to be delivered, intermediary 530 may determine the best-fit locker for the package. The size-dimensions may include a height, width and depth of the box in which the ordered items are packed, and may be obtained using various optical or electronic sensors. Upon receiving the size-dimensions of the package, intermediary 530 may retrieve from a locker manager a list of available locker compartments and their sizes. Using the received size-dimensions and the list, intermediary 530 may identify a locker compartment that is just large enough to store the package. Such a locker compartment may be referred to as a best-fit digital locker.

Once the ordered item is delivered to a digital locker, intermediary 530, in step 536, may notify seller 520 that the ordered item has been deposited in the digital locker. For example, intermediary 530 may send a notification or any type of message to seller 520 to let the seller know that the package has been delivered to the digital locker. The notification or the message may be dispatched to seller 520 as an email, a post at a social network, a text message, a voice message, or any other type of message.

In an embodiment, intermediary 530 notifies seller 520, as depicted using line 537, notifies buyer 510, as depicted using line 538, or both seller 520 and buyer 510.

In an embodiment, intermediary 530 may notify both seller 520 and buyer 510. For example, intermediary 530 may send the notification to seller 520, as depicted in line 537, and may send the notification to buyer 510, as depicted in line 538. The content and manner of notification may, or may not, be identical. For example, the notification sent to buyer 510 may include an access code to the digital locker, so that buyer 510 may open up the locker compartment and retrieve the ordered item from the compartment; while the notification sent to seller 520 may not include an access code to the digital locker and the notifications to buyer 510 and seller 520 may be made using different methods.

In step 526, seller 520 receives a notification from intermediary 530. The notification may indicate that the items ordered by buyer 510 have been deposited in a particular compartment of a digital locker. For example, the notification may indicate a physical address of the digital locker facility at which the digital locker is installed, the identification of the compartment and an access code to open the locker compartment.

Alternatively, the notification may include a hyperlink to a web-page that contains a physical address of the digital locker facility at which the digital locker is located, the identification of the locker compartment and an access code to open the locker compartment.

In an embodiment, the notification indicates that the location of the package will be provided to seller 520 (or buyer 510) in a separate correspondence, or a package mailing slip. The slip may include encoded information of the address, an identifier of the digital locker, and access code of the locker compartment at which the package has been deposited. The encoded information may be in the form of a QR code, a bar code, or any other code that seller 520 may use.

In step 528, seller 520 notifies buyer 510 that the ordered items have been delivered to a digital locker For example, seller 520 may sent a notification to buyer 510 to indicate the location of the locker compartment in which the ordered items have been deposited.

In step 514, buyer 510 receives a notification from either seller 520, or intermediary 530, or both. The notification may include the address information of the digital locker in which the ordered items have been deposited. The notification may also include the locker compartment identification and an access code for the locker compartment.

In step 516, buyer 510 proceeds to the facility that contains the digital locker identified in the notification received in step 514. Then, buyer 510 uses the access code to access the identified digital locker, and picks up the ordered items from the locker compartment.

Once the goods are removed from a locker compartment, a digital locker may notify a digital locker delivery system that the goods have been retrieved from the locker.

Determining whether the goods have been retrieved from a digital locker may be performed using a variety of methods and implementing a variety of sensors. For example, a digital locker may monitor sensors installed inside the locker compartment, and upon receiving an indication that the weight-readings detected by the sensors indicate an empty locker, the digital locker may deduce that that the items have been retrieved from the compartment.

The weight-readings provided by sensors of a digital locker may be used to monitor a digital locker. The monitoring may be performed by various entities, including intermediary 530, seller 520, and buyer 510. The monitoring may be performed for many purposes, including determining whether an item has been deposited in the locker, whether an item has been retrieved from the locker, whether the locker is empty, whether any locker compartment large enough to hold a particular item is available, and the like.

One of the benefits of monitoring a digital locker is an increase in the utilization of the locker compartments. For example, a digital locker delivery system may monitor the locker compartments to determine how long packages remain in locker compartments. A delivery system may collect information about a time duration during which a package remains in a locker compartment. If the time duration exceeds a certain amount, then a delivery system may generate and disseminate reminders for picking-up the package. The reminders may be sent to buyers and/or the sellers, and are intended to encourage for example, a buyer to pick up their packages from a locker compartments shortly after the package is deposited in the compartment.

Disseminating the reminders allows a delivery system to increase the utilization of the compartments. In some situations, a seller and/or a buyer may be charged fees if they let a package remain in the locker compartment longer than a specified time. In other situations, a buyer may be charged fees if the buyer fails to pick up a package from a locker compartment shortly after the package was deposited in a locker compartment. For example, if a buyer fails to pick up a package from a locker compartment for more than five days, then the buyer may be charged a fee to compensate a seller for the delay in receiving a payment for the selling the package to the buyer.

Another benefit of monitoring the digital lockers is to reward those who help to increase the utilization of the locker compartments. For example, a seller may offer some incentives or discounts to buyers who pick up their packages from the locker compartments shortly after the packages are delivered to the compartments. Similarly, a delivery system may offer some incentives or discounts to the sellers and buyers who use the locker compartments for short periods of time. The incentives may include monetary discounts, coupons, merchandise discounts, service discounts, and the like.

In an embodiment, if seller 520 owns a digital locker, then seller 520 may monitor a locker compartment managed by the digital locker. The monitoring of the locker compartment may include determining whether a package was deposited in the locker compartment, determining whether a package deposited in the compartment has been picked up, how long a package remained in the compartment, whether a package remained in the compartment longer than a specified time, whether a package been picked up within a specified time, and the like. For example, if a package has not been picked up from a locker compartment for more than seven days, then seller 520 may generate a reminder about the package, and send the reminder to buyer 510 to encourage the buyer to retrieve the package from the compartment.

A digital locker may be also be monitored by intermediary 530 to determine whether a package deposited in a locker compartment has been picked up, how long a package remains in the compartment, has the package remained in the compartment longer than a specified time, has the package been picked up within a specified time, and the like. For example, if the package has remained in the compartment for more than seven days, then an intermediary may generate a reminder, and send the reminder to a seller, a buyer, or a digital locker system. The digital locker system may notify a shipping company and encourage the shipping company to urge the buyer to pick up the package from the locker compartment.

3.0 Examples of Digital Lockers

Digital lockers may be implemented using various methods and using a variety of components. An example implementation of a digital locker is depicted in FIG. 6.

Figure 6:
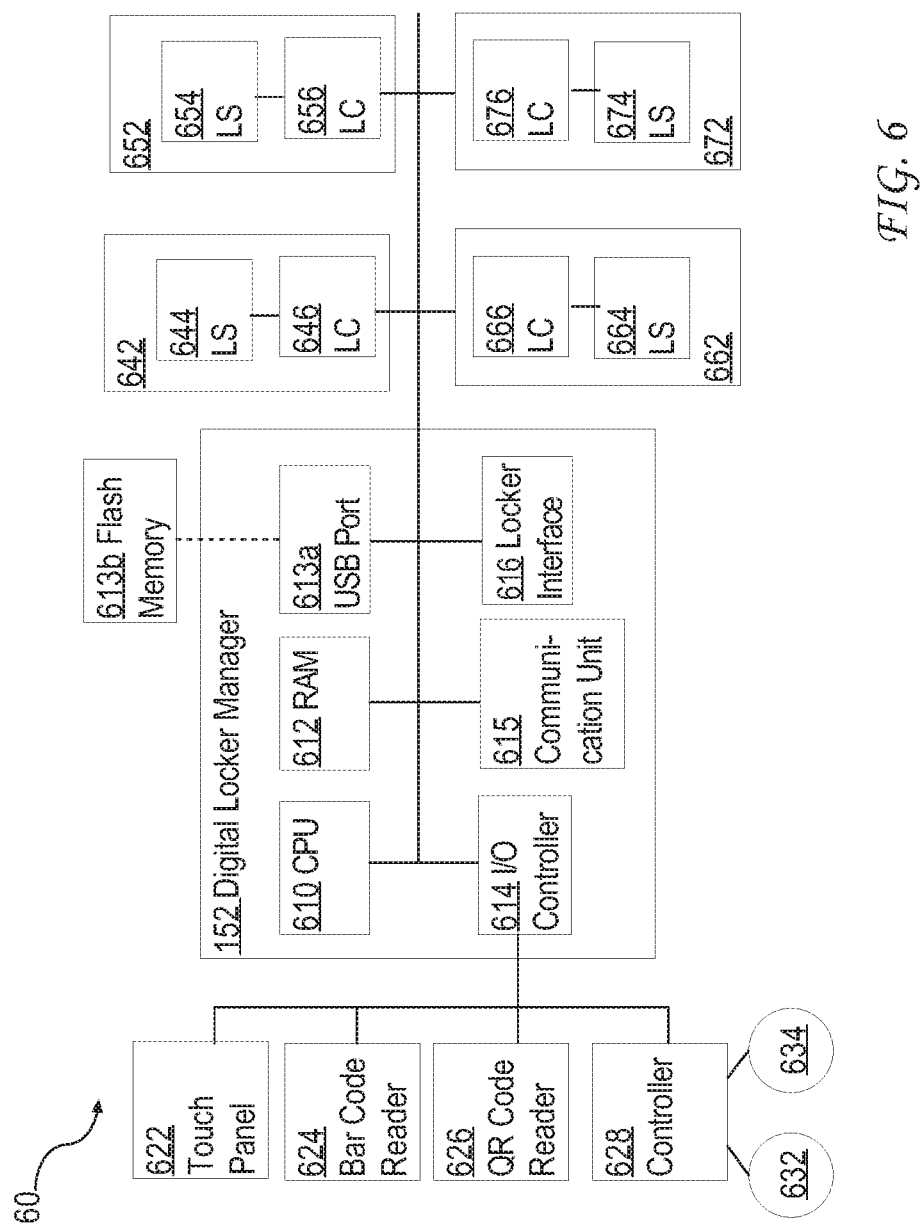
FIG. 6 is a block diagram that depicts an example digital locker.

FIG. 6 is a block diagram that depicts an example digital locker 60. Digital locker 60 comprises a digital locker manager 152, touch panel 622, various code readers 624, 626, various controllers 628, and one or more locker compartments 642, 652, 662, 672. A locker compartment 642 (652, 662, 672) comprises a physical locker compartment, a locker sensor 644 (654, 664, 674) and a locker controller 646 (656, 666, 676). Locker sensor 644 (654, 664, 674) may be any type of electronic sensor, mechanical sensor, optical sensor, camera, scanner, and the like configured to collect information about items, locker compartments and users. Locker sensors are described in detail in FIG. 1.

Touch panel 622 may be configured to input data provided by a user, and display information for the user. For example, touch panel 622 may be configured to display a menu containing various options that a user may choose to initiate entering data to digital locker 60. A menu may include displays of various screens containing one or more options that the user may select by touching the option-label displayed in touch panel 622. Touch panels are described in detail in FIG. 3-4.

Bar code reader 624 and QR code reader 626 may be configured as data input devices for scanning encoded information. For example, bar code reader 624 may be configured to scan the code from a mailing slip, decode the data, and transmit the decoded data to digital locker manager 152. QR code reader 626 may be configured to scan a QR code displayed on a packaging or an identification card, and transmit the encoded data to digital locker manager 152. Code readers are described in detail in FIG. 4-5.

Controller 628 may be configured to control one or more controls 632, 634. Controls 632, 634 may be configured to accept input from a user and communicate the input to controller 628, which in turn, may communicate the input to digital locker manager 152. Controls and controller are described in FIG. 3-4.

Digital locker manager 152 may comprise one or more CPU units 610, one or more RAM units 612, one or more USB ports 613a to connect one or more flash memory units 613b, one or more I/O controllers 614, one or more communication units 615, and one or more locker interfaces 616.

In an embodiment, digital locker manager 152 includes some additional components not depicted in FIG. 6. For example, digital locker manager 152 may include one or more storage devices for storing data, or may include one or more databases implemented in the storage devices.

In an embodiment, digital locker manager 152 is configured to control operations and communications exchanged with digital locker 60 and within digital locker 60. For example, digital locker manager 152 may control the usage of locker compartments 642, 652, 662, 672, control locker interface 616, and control touch panel 622 to allow a user to communicate with digital locker manager 152. For example, digital locker manager 152 may control interactions between digital locker manager 152 and users, such as carriers, deliverymen, receivers of the packages, and users returning the received goods.

Digital locker manager 152 may also be configured to communicate with locker controllers 646, 656, 666, and 676. For example, digital locker manager 152 may collect information from locker controllers 646, 656, 666, 676 indicating whether items have been deposited in locker compartments, whether items have been retrieved from locker compartments, how long the times remained in the locker compartments, and the like. Locker controllers 646, 656, 666, 676 may also provide to digital locker manager 152 the indications whether locker compartments have been open or whether the locker compartments have been closed.

In an embodiment, locker controller 646 (656, 666, 676) is configured to request and obtain weight-readings from locker sensor 644 (654, 664, 674).

Locker sensor 644 (654, 664, 674) may be configured to determine a weight of an item deposited in locker compartment 642 (652, 662, 672), and provide the weight reading to locker controller 646 (656, 666, 676). Based on the received weight reading, locker controller 646 (656, 666, 676) may determine whether the item was retrieved from locker compartment 642 (652, 662, 672), whether locker compartment 642 (652, 662, 672) is empty, whether locker compartment 642 (652, 662, 672) is available for storing an item, and the like.

4.0 Identifying the Best-Fit Locker for a Package

One of the benefits of determining the best-fit locker for a package is to improve the utilization of lockers. For example, if a digital locker facility maintains small lockers, medium lockers, and large lockers, then selection of a locker for storing a package may be based on the best-fit-approach for matching the package with a locker.

In this approach, if the package is a letter, and a small locker is large enough to hold the letter, then a delivery system may search for a small locker and use such a small locker as the best-fit locker for the letter. Hence, if at least one small locker is available, then the delivery system may select the small locker for holding the letter even if medium lockers and large lockers are available. Using this approach, other lockers, such as medium lockers and large lockers, may remain available to other customers who wish to send items larger than those that fit in the small lockers.

In an embodiment, a digital locker delivery system determines and identifies a locker compartment that is the best-fit compartment for storing a package. In some situations, a sender or a package-delivery-intermediary may provide an identification of a locker compartment in which the package is to be deposited. In such situations, the delivery system may check whether the identified locker is large enough to hold the package. If the identified locker is indeed large enough, then the delivery system may use the identified locker for storing the package. However, if the identified locker is too small, or otherwise not suitable for storing the package, then the delivery system may try to find a more suitable locker compartment.

In determining the best-fit locker compartment for a package, a digital locker delivery system may take into consideration a variety of factors, including a size of the package, popularity of the locker compartments, availability of the lockers, demand on the lockers, and the like. For example, upon receiving a request to store a particular package, a delivery system may obtain the measurements of the package, and then, based on the measurements of the package, determine a particular locker compartment that size-wise is large enough to hold the package. The delivery system may obtain the measurements of the package from other entities, such as sellers, senders, a package delivery-intermediary, and the like. For example, the measurements may be provided by UPS or FedEx. Alternatively, the measurements of the package may be provided by a seller or a sender of the package.

In situations when a package is actually delivered to a station of a digital locker delivery system, the system may use its own tools to measure the size of the package. For example, the size of the package may be determined using various optical scanners, electronic sensors, and the like.

Once measurements of the package are provided to a digital locker delivery system, the delivery system may use the measurements to find a locker compartment that is suitable for holding the package. One example of the process for collecting and identifying the most suitable locker compartment is described in FIG. 7.

FIG. 7 is a block diagram that depicts a process of identifying a best-fit locker compartment for a package. In an embodiment, the process of identifying the best-fit locker compartment is implemented in a delivery system. For example, the process may be implemented in a digital locker manager 1104 of the delivery system. However, in other embodiments, the process may be implemented in other components of the delivery system or in other elements configured to implement the process.

In step 7010, locker manager 1104 receives encoded information from a seller, a sender or other entity that wishes to send a package or a letter to a recipient. The encoded information may include information about the package to be sent and instructions for sending the package. For example, the encoded information may include a name and an address of the sender, a name and an address of the recipient, instructions for sending the package to the recipient, and any additional information useful in arranging the shipment of the package to the recipient.

In an embodiment, encoded information also includes a package handling instructions. For example, the encoded information may include instructions indicating the date by which the package is to be delivered to a digital locker, whether a sender of the package is to be notified that the package has been delivered to the digital locker, whether a buyer of an item included in the package is to be notified that the package has been delivered to the digital locker, whether the sender and/or an intermediary are to be notified when the package is picked up by the buyer, and the like. Furthermore, the encoded information may include instructions pertaining to notifications that the package remains in the digital locker longer than a certain period of time, and pertaining to information about any awards that are available if the package is picked up from the digital locker shortly after the package was delivered to the digital locker. Other instructions, such as instructions to a carrier of the package or indications whether the package has been insured may also be included in the encoded information.

In an embodiment, encoded information is represented as a bar code. A bar code may be scanned using a bar-code-scanner, such as bar-code-reader 624 in FIG. 6. The scanned bar code may be translated from the encoded form to a readable form using a software application configured to decode the encoded data.

In an embodiment, encoded information is represented as a QR code. A QR code maybe scanned using a QR-code-scanner, such as a QR-code-reader 626 in FIG. 6. The scanned QR code may be translated from the encoded form to a readable form using a software application configured to decode the encoded data.

In step 7012, locker manager 1104 analyses the decoded data and extracts identification data from the decoded data. For example, the delivery system may extract from the decoded data the name of the sender, the name of the recipient, and the instructions for handling the package. Furthermore, the delivery system may extract identification, a name and/or an address of an intermediary who has been selected for arranging a delivery of the package to a digital locker. The intermediary may be any entity that is capable of managing the package delivery, such as UPS, FedEx, DHL, and the like. The intermediary may be selected by a sender of the package.

In situations when the sender of the package has not selected an intermediary, a locker manager may select an intermediary for the sender. For example, the locker manager may determine the intermediary for the sender based on a history of previous transactions initiated by the sender. The locker manager may also determine the intermediary for the sender based on a pool of the intermediaries available at a given location and at the given time. Other methods for selecting an intermediary may also be implemented.

In step 7014, locker manager 1104 sends the extracted data to an intermediary. For example, the delivery system may send to the intermediary the name of the sender of the package, the name of the recipient, the address of the recipient, the instructions for handling the delivery of the package, and other information related to delivering the package to the recipient.

Upon receiving the extracted data, an intermediary may generate package information for the delivery of the package. For example, an intermediary may generate a package slip, and include in the slip information about the sender, the recipient, and handling the package. The information included in the package slip may be presented in an encoded form, such as a bar code, a QR code, or any other code that a locker manager may decode.

In an embodiment, an intermediary also determines a digital locker to which the package is to be delivered. For example, an intermediary may have a list of digital lockers that are available and empty at the moment, and use the list of the digital lockers to determine a particular digital locker that has a locker compartment large enough to hold the package. Various methods for determining such a digital locker are described in FIG. 8.

Alternatively, an intermediary may receive identification information about the digital locker from a sender or from a buyer. For example, some sellers prefer to use certain digital lockers installed in particular locations. For example, if a seller sends a package to a buyer located in San Jose, Calif., and the seller often uses the digital lockers installed in the downtown-train-station in San Jose, then the seller may notify the intermediary that the package is to be delivered to a digital locker installed in San Jose' train station. However, the seller may also delegate the task of selecting a digital locker for the package to the intermediary.

In step 7016, locker manager 1104 sends a request to an intermediary to provide package information for the package. Upon receiving the request, the intermediary sends the package information to the delivery system.

In an embodiment, the package information identifies the sender, the buyer, the package-handling instructions, and the like.

In an embodiment, the package information also includes identification of a digital locker to which the package is to be delivered. The digital locker might have been selected by a sender of the package, or otherwise provided to the intermediary. Including in the package information the identification of the digital locker to which the package is to be delivered is optional. Hence, while in some cases the package information includes the digital locker's identification, in other cases, the package information does not provide the locker's information.

In step 7018, locker manager 1104 analyses the received package information and determines whether the package information includes identification of the digital locker to which the package is to be delivered. For example, the locker manager may parse the package information and search of an identifier of a digital locker. The identifier may be provided in a form of a code that uniquely identifies a digital locker facility and the digital locker in the digital locker facility.

If the locker manager determined that the package information contains the identification of the digital locker, then the process proceeds to step 7022. Otherwise, the process proceeds to step 7020, in which locker manager 1104 tries to find the best-fit locker for the package.

In step 7020, locker manager 1104 searches for the best-fit locker for the package. Searching for the best-fit locker may include determining the measurements of the package, determining measurements of available (empty) lockers, and finding the best match between the measurements of the package and the measurements of the lockers.

In an embodiment, locker manager 1104 requests and receives measurements of the package from an intermediary, a seller, or a sender of the package. For example, locker manager 1104 may determine an identifier of the package from tracking information of the package, and request providing the measurements of the package identified by the identifier.

In an embodiment, locker manager 1104 requests and receives measurements of the empty lockers from a database maintained by locker manager 1104. For example, locker manager 1104 may determine identifiers of the empty lockers, and retrieve the measurements of the empty lockers identified based on the identifiers.

Once locker manager 1104 receives the measurements of the package and the measurements of the empty lockers, locker manager 1104 may execute an optimization-based-application, which may determine the locker that is the best-fit locker for the package.

In step 7022, a locker manager 1104 verifies whether a locker compartment of the digital locker identified in the package information is large enough to hold the package. For example, in some cases the identified digital locker may be too small to hold the package. In some other cases, the identified digital locker may too large to hold the package, and other more suitable lockers are available for storing the package. Hence, unless the particular digital locker was explicitly requested by a seller or other entity, the delivery system may verify whether another digital locker that is more suitable for holding the package is available.

If the identified digital locker is the best-fit locker for the package, then the process proceeds to step 7030, in which locker manager 1104 generates a notification indicating that the digital locker, identified by the locker identifier, is large enough to hold the package. However, if the identified digital locker is not large enough to hold the package, then the process proceeds to step 7024.

In step 7024, locker manager 1104 determines whether any empty locker is available at the moment. For example, locker manager 1104 may try to determine one or more digital lockers that are empty at the moment.

If at least one empty locker is found, then the process proceeds to step 7020, in which locker manager 1104 determines which of the empty lockers is the best-fit lockers for the package. Otherwise, the process proceeds to step 7026, in which locker manager 1104 sends a notification to a seller or a sender to inform them that no suitable locker is available for the package at the moment. That may happen when the digital locker identified by the sender or the seller is too small to hold the package and no other suitable locker for the package is available at the moment.

5.0 Delivering a Package to a Digital Locker

5.1 Flow Chart

Figure 8:
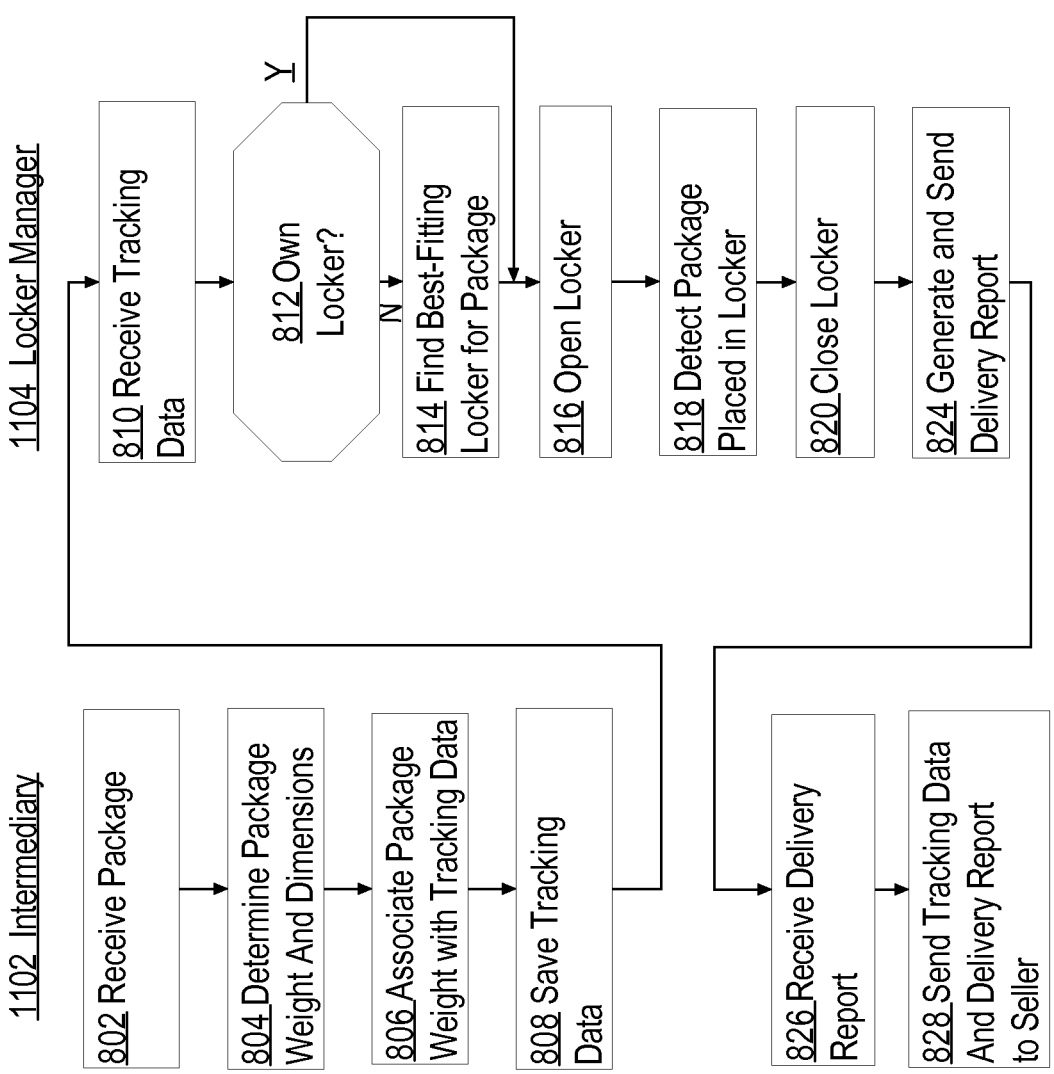
FIG. 8 is a flow chart that depicts a process of delivering a package to a digital locker.

FIG. 8 is a flow chart that depicts a process of delivering a package to a digital locker. For the purpose of describing the process, it is assumed that a seller or a sender of a package has already delivered the package to an intermediary, or made arrangements for the package to be delivered to the intermediary from some location. For example, a seller might have delivered the package directly to the intermediary, or the seller might have made the arrangements for a warehouse or a courier to deliver the package to the intermediary.

In an embodiment, an intermediary 1102 is a company that provides shipping and logistics services. Intermediary 1102 may be a package delivery company, a document delivery company, a courier-delivery-service company, an international express mail delivery company, an air-mail delivery company, and the like. Some examples of intermediary 1102 may include UPS, FedEx, DHL, and others. Intermediary 1102 may also be Amazon.com eBay.com, and others.

In an embodiment, a locker manager 1104 corresponds to a digital locker manager 152, described in FIG. 6, and may be implemented in software and/or hardware. Locker manager 1104 may be configured to manage one or more digital lockers and communicate instructions and messages between the digital lockers, sellers, and buyers. Locker manager 1104 may also be configured to determine which locker compartments associated with the digital lockers are empty, and/or which locker compartment associated with the digital lockers is the most suitable to hold a particular package.

In an embodiment, a locker manager 1104 corresponds to a digital locker manager 192, described in FIG. 2, and may be implemented in software and/or hardware. Locker manager 1104 may be configured to manage one or more digital locker facilities. Locker manager 1104 may or may not be physically located at the digital locker facilities that the locker manager manages. For example, locker manager 1104 may be located at a location separate from the digital lockers that the locker manager manages.

In step 802, intermediary 1102 receives a package that a seller or a sender wishes to have delivered to a digital locker. The package may include a printed label or a note indicating the sender, and the recipient of the package. For example, the package may have an attached label indicating the name and the address of the sender, the name and the address of the recipient, and other information, such as package-handling instructions, and the like.

In step 804, intermediary 1102 determines a weight and dimensions of the package. The weight and dimensions of the package may be determined using various scanners and sensors, including optical sensors, electronic sensors, mechanical sensors, and the like. The various methods for determining a weight and dimensions of the package are described in FIG. 6.

In step 806, intermediary 1102 associates measurements of the weight and dimensions of the package with tracking data. For example, the measurements may be entered into a database maintained by intermediary 1102, and saved in a tracking data record.

Besides the measurements of the package, a tracking data record may also include the identification of the package, the name/address of the sender, the name/address of the recipient, and other information. The tracking data record may have an assigned identifier or a sequence record. The identifier may be also referred to as a tracking number. The identifier (tracking number) may be used to uniquely identify and track the delivery of the package. For example, upon entering the tracking number into the system, a user may obtain a display of the information about the package and the real-time tracking information.

In step 808, tracking data for a package is saved in a database. For example, the tracking record for the package may be saved in a database maintained by intermediary 1102. The tracking data may also be printed out on a physical tracking label, and the tracking label may be affixed to the package.

In an embodiment, prior to printing the tracking label for a package, the tracking data is encoded into a bar code or a QR code. Once the tracking data is encoded, the encoded tracking data may be printed on a physical tracking label, and then, the label may be affixed to the package.

In step 810, locker manager 1104 receives tracking data for a package. For example, a delivery person (a courier) may use a sensor or a scanner to scan an encoded tracking label affixed to the package, and the scanner may transmit the scanned encoded tracking information to locker manager 1104. The delivery person may be a person hired by intermediary 1102 to deliver the package to a digital locker.

In an embodiment, locker manager 1104 receives tracking data for a package from a digital locker controller of a digital locker. For example, if the delivery person used a scanner to scan an encoded tracking label on the package, then the encoded data may be transmitted from the sensor/scanner to a digital controller, and the digital controller may communicate the encoded data to locker manager 1104.

In step 812, locker manager 1104 decodes the encoded tracking data, parses the decoded data, and determines whether the parsed information includes an indication of a digital locker to which the package is to be delivered. For example, the decoded data may include an identifier of the digital locker that a seller owns and wants to use for storing the package.

If the decoded data contains an indication of a digital locker to which the package is to be delivered, then the process proceeds to step 816. Otherwise, the process proceeds to step 814.

In step 814, locker manager 1104 tries to find the best-fit locker for the package. To find the best-fit locker for the package, locker manager 1104 may retrieve or otherwise obtain measurements of the package. For example, locker manager 1104 may parse the decoded tracking data to determine whether the measurements of the package are included in the tracking information in the tracking label affixed on the package. If the tracking information does not contain the measurement information for the package, then locker manager 1104 may request the measurement information from intermediary 1102.

According to another example, locker manager 1104 may also request the measurements information from other sources, such as a seller or other entity facilitating the handling of the package.

Furthermore, locker manager 1104 may display a message on a touch panel for a package-delivery person. The message may provide instructions for placing the package in front of one of the sensors of the digital locker. Examples of the sensors include sensors 1030, 1040, described in FIG. 3-4. The sensor may scan a three-dimensional image of the package, and based on the scanned image, locker manager 1104 may determine the dimensions of the package. Other methods of determining the dimensions of the package by locker manager 1104 may also be implemented.

Locker manager 1104 may also retrieve, or otherwise obtain, information about the available digital lockers. For example, locker manager 1104 may retrieve information about locker compartment of the digital lockers that are available (or empty) at the moment. The information about such locker compartment may include the dimensions of the locker compartments. If such information is readily available to locker manager 1104, then locker manager 1104 may simply retrieve such information from its own database or data storage.

However, if such information is not readily available, then locker manager 1104 may send a request to one or more digital lockers to collect and provide such information. For example, locker manager 1104 may ask that the digital controllers of the digital lockers collect the information from locker sensors, and provide the collected information to locker manager 1104. Functionalities of the digital controllers and the digital sensors are described in FIG. 6.

Once the measurements of the package and the dimensions of the available locker compartments are received, or otherwise obtained, by locker manager 1104, locker manager 1104 may use them to determine the best-fit locker for the package. For example, locker manager may compare the measurements of the package with the dimensions of the available locker compartments, and select the locker compartment that is large enough to hold the package. Various methods of determining the best-fit locker for the package are described in FIG. 7.

Once the best-fit locker for the package is identified, locker manager 1104 may allow opening the best-fit locker so that the package may be deposited in the locker. This may be accomplished in a variety of ways. For example, locker manager 1104 may retrieve an access code for the identified locker, and send the access code to a digital controller of the identified locker. Upon receiving the access code, the digital controller may unlock the locker, and, in step 816, open the door of the locker.

According to another example, locker manager 1104 may retrieve an access code for the identified locker, and send the access code to intermediary 1108, which in turn, may communicate the access code to a package-delivery person. Upon receiving the access code, the package-delivery person may enter the access code to the digital locker using a touch panel of the digital locker. Examples of the touch panels are described in FIG. 3-4.

In step 818, locker manager 1104 detects that a package has been placed in a digital locker. Locker manager 1104 may detect that using a variety of methods. For example, locker manager 1104 may send a request to a digital control of the digital locker to provide weight readings from the digital locker. The weight readings may be obtained and collected by one or more sensors installed in the digital locker.

Locker manager 1104 may use the weight readings received from a digital controller to monitor the weight readings and determine whether the readings indicate an increase in weight. The weight increase occurs when a package is delivered in the digital locker compartment, and because at that moment, the sensors register an increase in the weight of the compartment. The weight increase may be monitored periodically and using a certain error margin.

When the weight readings provided by a digital controller indicate that the weight of the compartment has been increased, locker manager 1104 may determine that a package has been deposited in the locker. In an embodiment, locker manager 1104 may compare the weight reading with a reference weight of the package to determine whether the item delivered to the locker is indeed the package.

In step 820, locker manager 1104 sends a message to a digital controller of the digital locker to close the locker. The locker may be closed automatically be the digital controller, or a message may be displayed on a touch panel of the digital locker with instructions for closing the locker. For example, locker manager 1104 may send a message to the digital controller to enable closing the locker compartment, and at the same time, display a message on the touch panel for a package-delivery person to physically close the door of the digital locker.

In step 824, locker manager 1104 generates a delivery report indicating that the package has been successfully delivered to the digital locker. The delivery report may be sent to various individuals and entities. For example, the delivery report may be sent a sender of the message, and/or to a recipient of the package. The delivery report may also be sent to intermediary 1102, or any other packet-handling entity involved in shipping the package.

In step 826, intermediary 1102 receives a delivery report from locker manager 1104. Upon receiving the report, intermediary 1102 may send a message to a sender, or a seller, of the package. The message may indicate that the package was successfully delivered to a digital locker, and that the package is ready to be picked up by a recipient of the package.

In an embodiment, a message may also include instructions for using the digital locker in which the package was deposited. For example, the message may provide identification of the digital locker and an access code to open the locker. The identification may include a physical address of the facility at which the digital locker is located, and the number (or an identifier) of the digital locker.

In an embodiment, a message may also specify that the sooner the package is picked up from the digital locker, the larger award may be provided to a sender and/or to a recipient. For example, one type of message may indicate that if the package is picked up within three days, then the sender and/or the recipient will be entered into a sweepstake or a lottery and will have a chance to with some prizes. Another type of message may indicate that if the package is not picked up within seven days, then the cost of renting the digital locker by the sender will be increased by a certain amount of money. Other type of message may indicate that if the package is picked after more than thirty days, then the package will be removed from the digital locker by an associate from a digital locker delivery system. Other messages may also be sent to the sender and/or the recipient.

5.2 Time Chart

Figure 9:
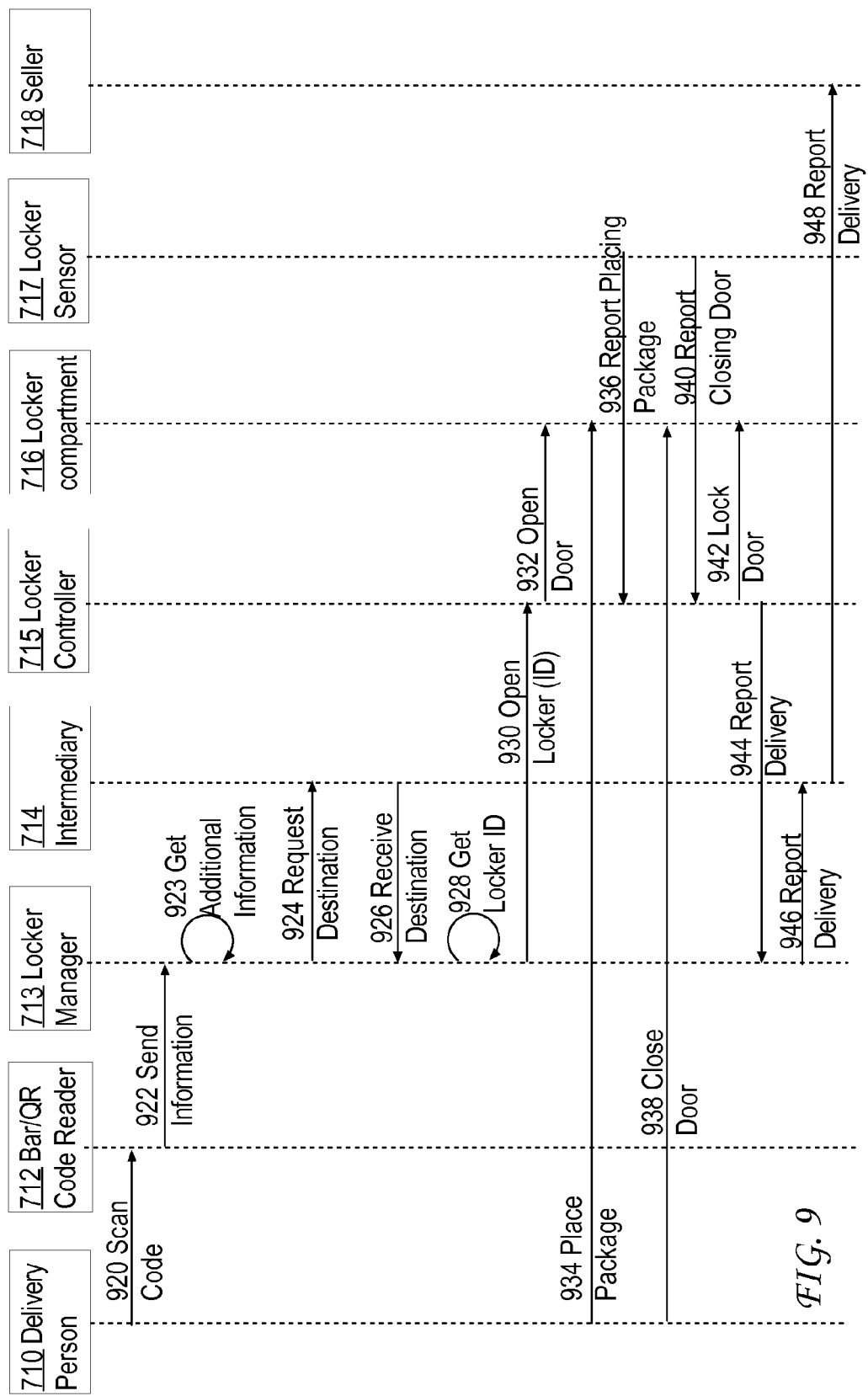
FIG. 9 is an example time chart for a process of delivering a package to a digital locker.

FIG. 9 is an example time chart for a process of delivering a package to a digital locker. In the depicted time chart, the communications are exchanged between a delivery person 710, a bar/QR code reader 712, a locker manager 713, an intermediary 714, a locker controller 715, a locker compartment 716, a locker sensor 717, and a seller 718.

The example depicted in FIG. 9 is one of many examples of the communications exchanged between entities and elements 710-718 as a package is delivered to a digital locker. In other examples, the communications may be exchanged between some of the entities and elements 710-718, but not all of them. In yet other examples, communications other than those depicted in FIG. 9 may be exchanged between the entities and elements 710-718.

Referring to FIG. 9, in an embodiment, a delivery person 710 is in possession of the package that a seller 718 wishes to have delivered to a package's recipient. Delivery person 710 may use a scanning device to scan, in step 920, a label affixed to the package. The label may include information about the package, such as the tracking number of the package, the name/address of the sender of the package, the name/address of the recipient, and the like.

In an embodiment, information included in the label affixed to the package is encoded into code. The code may be a bar code or a QR code and may be generated and placed on the package by a seller or a package courier. The scanned code may be communicated to a bar/QR code reader 712, which may decode the code, and store the decoded data.

In step 922, a bar/QR code reader may send the decoded data to a locker manager 713.

In step 923, locker manager 713 may parse the decoded data, and extract, from the decoded data, information about the package. For example, locker manager 713 may extract, from the decoded data, the name/address of the sender of the package, the name/address of the recipient of the package, instructions for handling the package, and other information about the package. Locker manager 713 may also extract, from the decoded data, a tracking number of the package and other identification information of the package.

While in some embodiments the above information may be included in the decoded data, in other embodiments, the above information may be missing from the decoded data and a package-label. If the above information is not included in the decoded data, then locker manager 713 may request that information from for example, an intermediary 714, a seller 718, or others.

In step 924, locker manager 713 determines a destination of the package. For example, locker manager 713 may request the destination information for the package from intermediary 714. The request may include tracking information of the package, or other form of the identification of the package.

Upon receiving a request for providing destination information of the package, intermediary 714, may parse the request, and extract from the request tracking information of the package. Using the tracking information of the package, intermediary 714 may retrieve the destination information for the package. The destination information for the package may include the address of the digital locker facility in which the package is to be stored.

In step 926, locker manager 713 receives destination information for the package. In an embodiment, the destination information for the package may include the address of the digital locker facility in which a digital locker for storing the package is present.

In step 928, locker manager 713 obtains a locker identifier of the digital locker in which the package is to be deposited. For example, a locker identifier may be provided in tracking information included in the label affixed to the package. According to another example, a locker identifier may be provided in the decoded data included in the label. According to yet other example, a locker identifier may be provided to locker manager 713 by seller 718, intermediary 714, or other entity.

In step 930, locker manager 713 sends a request to a locker controller 715 to open a digital locker that is associated with the locker identifier. Locker manager 713 may include in the request the locker identifier and a command indicating a request to open the digital locker identified by the provided locker identifier.

Upon receiving the request to open a digital locker associated with the digital locker identifier, locker controller 715 causes a locker compartment 716 to open the door of the locker. Locker controller 715 may either mechanically release a latch or a clasp attached to the door, and cause the door open, or may send an electronic signal to the circuitry of the locker compartment to open the door.

Once the door of the digital locker is open, in step 934, delivery person 710 places the package in the compartment of the digital locker.

In step 936, locker sensor 717 obtains a weight reading from the locker compartment, and transmits the weight reading to locker controller 715. Because the weight of the locker compartment has been increased since the package was placed in the compartment, the weight reading obtained by locker sensor 717 may be used to verify that one or more objects have been placed in the locker compartment.

In step 938, delivery person 710 closes the door of the locker compartment, in which the package was deposited.

In step 940, locker sensor 717 detects that the door of the locker compartment has been closed, and sends a signal to locker controller 715 to indicate to locker controller 715 that the door of the locker compartment has been closed.

In step 942, locker controller 715 receives a signal from locker sensor 717. The signal may indicate that the door of the locker has been closed. In response to receiving the signal, locker controller 715 causes a locker compartment 716 to lock the door of the locker. Locker controller 715 may either mechanically engage a latch attached to the door, and lock the door, or may send an electronic signal to the circuitry of the locker compartment to lock the door.

In step 944, locker controller 715 generates a report message, and sends the report message to locker manager 713. The report message may include information indicating that that the package was delivered and deposited in locker compartment 716. The report message may also include identification information of the digital locker that contains locker compartment 716. Additional information may also be provided in the report message. For example, the message may include identification of the package, identification of seller 718, identification of a recipient of the package, and the like.

In step 946, locker manager 713 receives the report message from locker controller 715, and uses the content of the report message to generate a delivery report. The delivery report may contain the same or some of the information as provided in the report message. The delivery report is sent to intermediary 714.

In step 948, intermediary 714 receives the delivery report from locker manager 713, and forwards the delivery message to seller 718. The delivery report may include information indicating that that the package was delivered and deposited in locker compartment 716, identification information of the digital locker that contains locker compartment 716, identification of the package, identification of a recipient of the package, and the like.

Upon receiving the delivery report, seller 718 becomes aware of the fact that the package was successfully delivered to locker compartment 716, and that the package is ready for a pick-up. In response to receiving the delivery report, seller 718 may send a message to a recipient to let the recipient know that the package is ready for a pick-up at the locker compartment 716.

6.0 Weight-Based-Verification of a Package Delivery

In an embodiment, a digital locker system is configured to measure and weigh content of a locker compartment of a digital locker. The measurements and weight may be determined using various weight sensors, light sensors, infra-red sensors, optical sensors, magnetic sensors, and the like. The sensors may be used to determine various characteristics of a package deposited in the locker compartment. The characteristics may include physical dimensions of a package, a weight of the package, a color of the wrapping of the package, an appearance of the package, and the like.

Measurement and weight characteristics may be used to determine whether a package was deposited in a digital locker, whether a correct package was deposited in the locker, whether the package was retrieved from the locker, and the like.

Measuring and weighing tools may be implemented by both, an intermediary and a digital locker. For example, one measurement system may be implemented in an intermediary that handles delivery of the package to the digital locker, and another measurement system may be implemented in the digital locker. The measurement system implemented in the intermediary may be configured to determine a weight of the package before the package is dispatched to a carrier. The measurement system implemented in the digital locker may be configured to determine a weight of an item deposited in a locker compartment.

In an embodiment, weight readings provided by a digital locker may be tested whether they are greater than zero value. For example, if a weight reading provided by a digital locker is greater than zero (within some tolerance), then the digital locker may determine that one or more objects have been placed in a locker compartment of the digital locker. This test may be used to determine whether a package was deposited in the locker.

In an embodiment, weight readings determined by a digital locker may be compared with weight readings determined by an intermediary. For example, if a non-zero weight reading determined by a digital locker corresponds to a weight reading determined by an intermediary for the package, then the digital locker may conclude that an object deposited in the locker compartment appears to be indeed the package. This comparison may be used to determine whether a particular package was indeed deposited in the locker.

In an embodiment, weight readings determined by a digital locker may be tested whether they approach zero value. For example, if weight readings determined by a digital locker changed from non-zero values to zero (within some tolerance), then the digital locker may determine that one or more objects have been removed from the locker compartment of the digital locker. This test may be used to determine whether a package was picked-up from the locker.

6.1 Flow Chart

Figure 10:
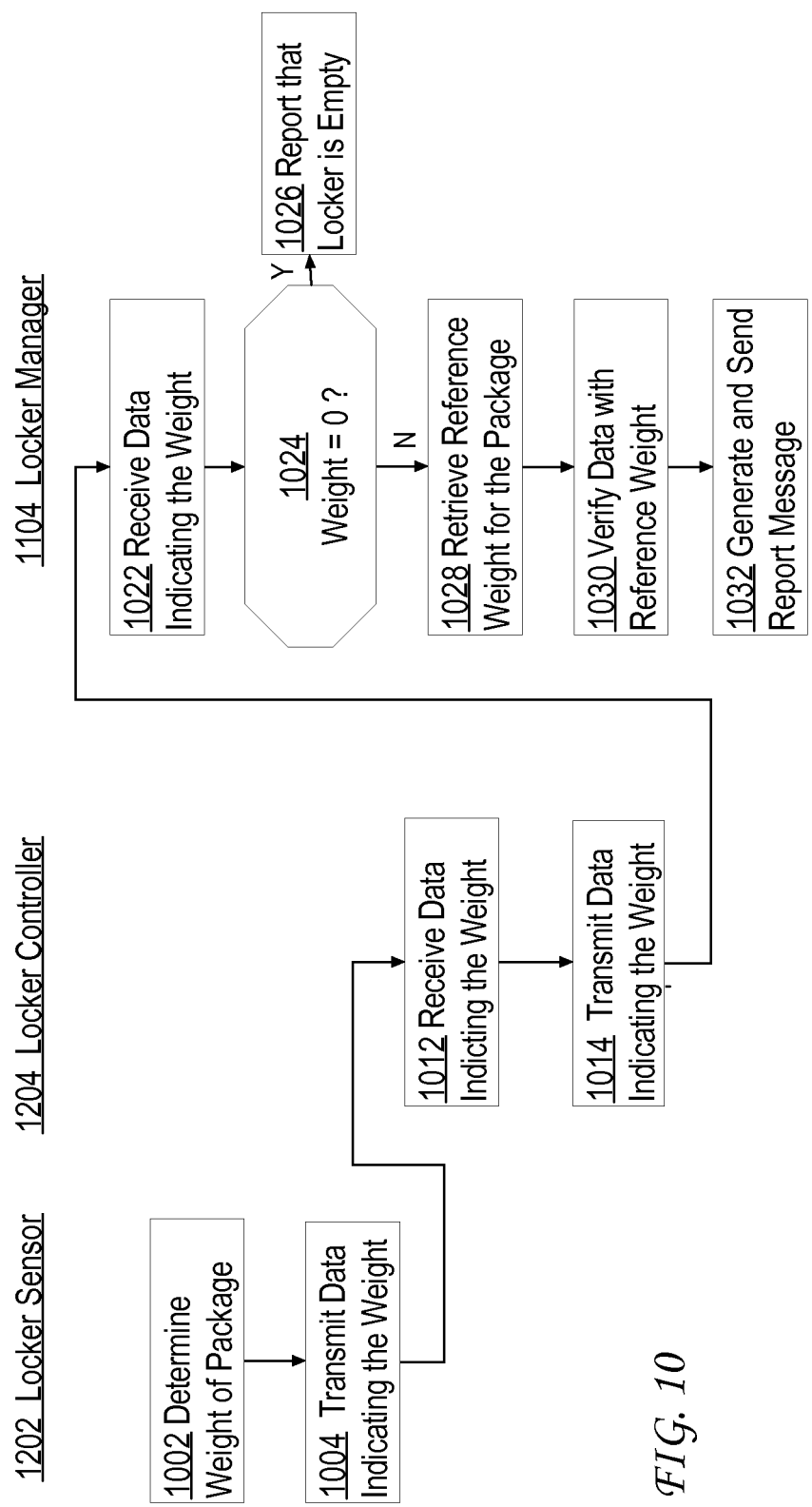
FIG. 10 is a flow chart that depicts a process of weight-based verification of a package delivery.

FIG. 10 is a flow chart that depicts an example process of weight-based verification of a package delivery. In the depicted example, locker sensor 1202 communicates with locker controller 1204, which in turn, communicates with locker manager 1104.

In step 1002, locker sensor 1202 determines a weight of the content deposited in a locker compartment of the digital locker. If the locker compartment is empty, then the weight reading is most likely zero. If one or more objects are deposited in the locker compartment, then the weight reading is most likely greater than zero.

In step 1004, locker sensor 1202 transmits the weight reading to locker controller 1204. The weight reading may be encoded in a body of a message that locker sensor 1202 may send to locker controller 1204. Alternatively, the weight reading may be encoded as a binary code, and the binary code may be send to locker controller 1204 using any type of a communications protocol.

In step 1012, locker controller 1204 receives the weight reading indicating the weight of the content of the locker compartment of the digital locker. If no item is deposited in the locker compartment, then the weight reading is most likely zero. However, if one or more objects are deposited in the locker, then the weight reading is most likely non-zero.

Upon receiving the weight reading, locker controller 1204 may retrieve an identifier of the digital locker, generate a data record containing the identifier of the digital locker and the weight reading, and save the data record in a database or a storage device communicatively coupled to the digital locker. The data record may be searchable based on the identifier of the digital locker, and may be searchable based on the weight reading. For example, if the identifier of the digital locker is provided, then the system may retrieve the data record containing the identifier, and from the data record, the weight of the content deposited in the digital locker identified by the identifier may be retrieved. Similarly, if the weight reading is provided, then the system may retrieve one or more data records containing the weight reading, and from the data records, the one or more identifiers of the digital lockers that hold packages having the weight indicated by the weight reading may be retrieved.

In step 1022, locker manager 1104 receives the weight reading indicating the weight of the content of the locker compartment of the digital locker.

In step 1024, locker manager 1104 tests whether the weight reading is close to zero (within a certain tolerance). If so, then in step 1026, locker manager 1104 generates a message indicating that the locker compartment of the digital locker is most likely empty. The determination may be inaccurate because it is possible that a very small piece of paper, a note, or a small letter still remains in the locker compartment even if locker sensor 1202 obtained the weight reading of zero. However, as the sensor-technology becomes more and more advanced, the weight reading may become more accurate.

If the weight reading is not close to zero, then in step 1028, locker manager 1104 retrieves a reference weight determined by an intermediary. For example, locker manager 1104 may provide an identifier of the digital locker to the intermediary, and request that the intermediary retrieve a data record containing the identifier of the digital locker. From the data record, locker manager 1104 may retrieve a reference weight of the content of the package. The reference weight of the content of the package corresponds to the weight of the package before the package was dispatched to the digital locker.

In step 1030, locker manager 1104 verifies the weight reading obtained from locker controller 1204 with the reference weight of the package. If the weight reading obtained from locker controller 1204 matches the reference weight of the package, then locker manager 1104 may determine that the package was indeed deposited in the locker compartment of the digital locker. However, if the weight reading obtained from locker controller 1204 does not match the reference weight of the package, then locker manager 1104 may determine that something other than the package was deposited in the compartment.

In step 1032, locker manager 1104 generates a report message, and sends the message to a seller, a sender, an intermediary, or a recipient of the package. For example, if the weight reading obtained from locker controller 1204 matched (within a certain tolerance) the reference weight of the package, then the report message may indicate to the seller, the sender and/or the recipient of the package that the package was indeed deposited in the locker compartment. The message may also include a timestamp indicating the date/time when the locker sensor 1202 detected that the package was deposited in the compartment. The message may also include information about the digital locker, such as an identifier of the digital locker, instructions for retrieving the package from the compartment, an access code for accessing the compartment, and the like.

However, if the weight reading obtained from locker controller 1204 does not match (within a certain tolerance) the reference weight of the package, then the report message may indicate to a seller, a sender, and/or recipient that some problem occurred in delivering the package to the digital locker, or that the package has still not been delivered to the locker. The message may also include contact information to an intermediary and/or a delivery person responsible for delivering the package to the digital locker.

6.2 Time Chart

Figure 11:
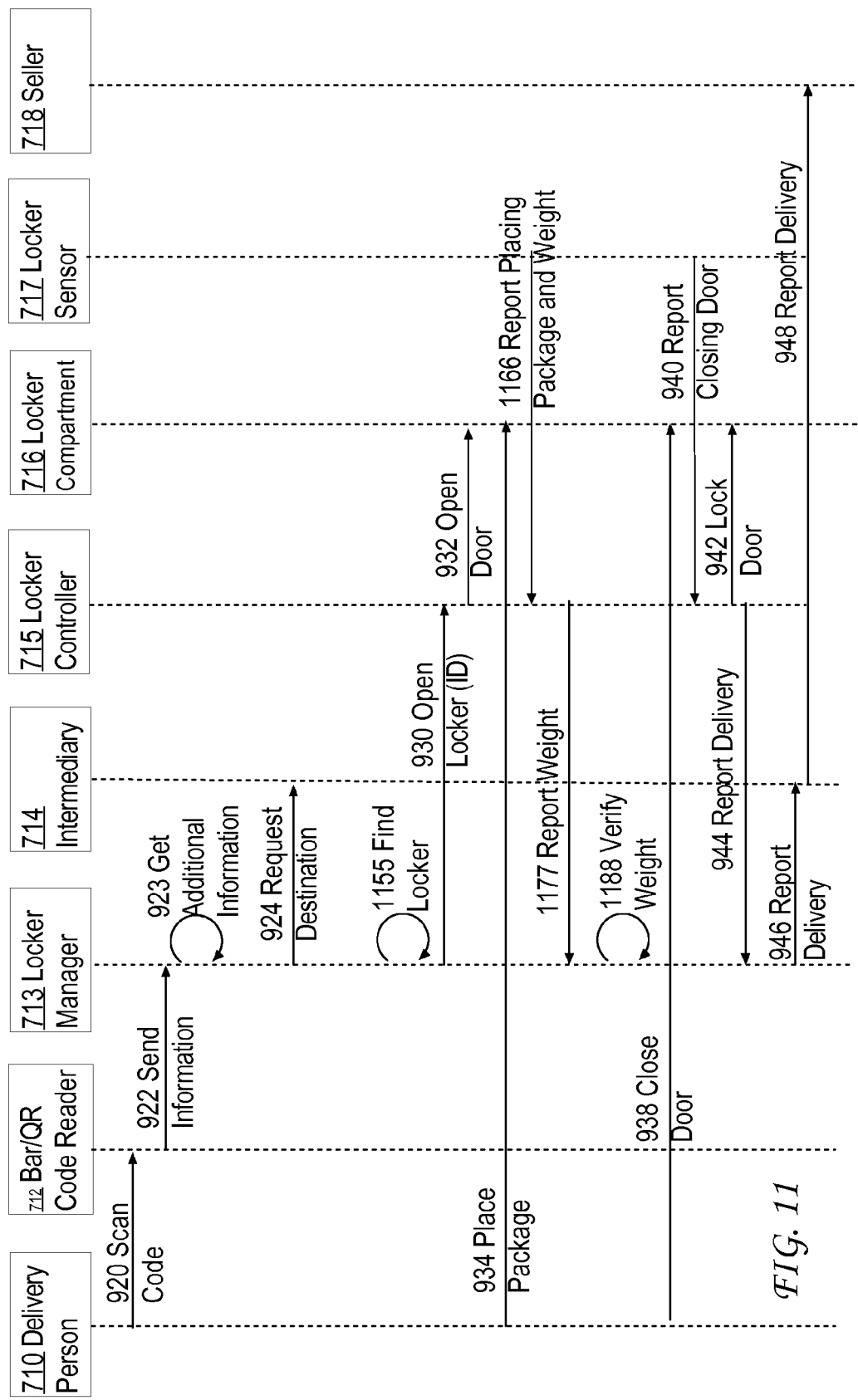
FIG. 11 is a time chart that depicts a process of weight-based verification of a package delivery.

FIG. 11 is a time chart that depicts a process of weight-based verification of a package delivery. In the depicted time chart, the communications are exchanged between a delivery person 710, a bar/QR code reader 712, a locker manager 713, an intermediary 714, a locker controller 715, a locker compartment 716, a locker sensor 717, and a seller 718.

The example depicted in FIG. 9 is one of many examples of the communications exchanged between entities and elements 710-718 as a package is delivered to a digital locker. In other examples, the communications may be exchanged between some of the entities and elements 710-718, but not all of them. In yet other examples, communications other than those depicted in FIG. 9 may be exchanged between the entities and elements 710-718.

Steps 920-948 in FIG. 11 correspond to steps 920-948 in FIG. 9, and have been described in detail in FIG. 9. Therefore, steps 920-948 are only briefly described in FIG. 11.

Steps 1155, 1166, 1177 and 1188 do not correspond to any steps described in FIG. 11. Therefore, steps 1155, 1166, 1177 and 1188 are described in detail below.

In step 920, a delivery person 710, who is in possession of the package that a seller 718 wishes to have delivered to a package's recipient, scans a label affixed to the package. The label may include information about the package, such as the tracking number of the package, the name/address of the sender of the package, the name/address of the recipient, and the like. The information may be encoded into a bar code or a QR code.

In step 922, a bar/QR code reader decodes the label information and sends the decoded data to a locker manager 713.

In step 923, locker manager 713 parses the decoded data, and extracts, from the decoded data, information about the package. Locker manager 713 may determine for example, measurements of the package, a weight of the package and other characteristics of the package.

In step 1155, locker manager 713 finds a digital locker for the package. For example, locker manager 713 may request an identifier of the digital locker for the package from intermediary 714. The request may include tracking information of the package, or other form of the identification of the package.

In an embodiment, locker manager 713 finds the best-fit locker for the package. For example, locker manager 713 may request, or otherwise obtain, the measurements of the package, and use the measurements to find the best-fit locker for the package. The measurements may be provided from Bar/QR code reader 712. Alternatively, locker manager 713 may request the measurement data from intermediary 714 or from seller 718. The process of finding the best-fit locker for the package is described in FIG. 7.

Upon determining the best-fit locker for the package, locker manager 713 may determine an identifier of the locker, and store the locker identifier in association with information about the package. For example, locker manager 713 may generate, or update, a tracking record containing the locker identifier of the digital locker in which the package will be stored, and the tracking information of the package.

In step 930, locker manager 713 sends a request to a locker controller 715 to open a digital locker that is associated with the locker identifier. Locker manager 713 may include in the request the locker identifier and a command indicating a request to open the digital locker identified by the provided locker identifier.

In step 932, locker controller 715 causes a locker compartment 716 to open the door of the locker. Locker controller 715 may either mechanically release a latch or a clasp attached to the door and cause the door open, or may send an electronic signal to the circuitry of the locker compartment to open the door.

In step 934, delivery person 710 places the package in the compartment of the digital locker.

In step 1166, a locker sensor 717 obtains a weight reading from the locker compartment, and transmits the weight reading to locker controller 715. Because the weight of the locker compartment has been increased since the package was placed in the compartment, the weight reading obtained by locker sensor 717 may be used to verify that one or more objects have been placed in the locker compartment.

In step 1177, locker controller 715 receives the weight reading from locker sensor 717, and reports the weight reading to locker manager 713.

In step 1188, locker manager 713 receives the weight reading from locker controller 715, and verifies whether the weight reading corresponds to a reference weight of the package. The reference weight of the package may be the weight determined by for example, intermediary 714 before the package was dispatched to delivery person 714. The reference weight of the package may also be determined by seller 718, a sender of the package, or other person who had an opportunity to weigh the actual package.

If the weight reading received from locker controller 715 matches the reference weight for the package within a certain tolerance, then locker manager 715 may conclude that the package was indeed delivered to the digital locker. However, if the weight reading received from locker controller 715 does not match the reference weight for the package within a certain tolerance, then locker manager 715 may conclude that the package was not delivered to the digital locker. For example, if the weight reading received from locker controller 715 is zero, then locker manager 715 may conclude that the digital locker is empty.

In an embodiment, upon verifying the received weight reading, locker controller 715 may generate a message and disseminate the message to seller 718, a sender of the message, or a recipient of the message. The message may indicate that for example, the package was indeed delivered to the digital locker, that the digital locker is empty, or that some object, other than the package, was deposited in the digital locker.

In step 938, delivery person 710 closes the door of the locker compartment, in which the package was deposited.

In step 940, locker sensor 717 detects that the door of the locker compartment has been closed, and sends a signal to locker controller 715 to indicate to locker controller 715 that the door of the locker compartment has been closed.

In step 942, locker controller 715 receives a signal from locker sensor 717 indicating that the door of the locker has been closed, and locks the door of the locker.

In step 944, locker controller 715 generates a report message, and sends the report message to locker manager 713. The report message may include information indicating that that the package was delivered and deposited in locker compartment 716, or that the locker is empty, or that some object, other than the package, was deposited in the digital locker.

In step 946, locker manager 713 receives the report message from locker controller 715, and uses the content of the report message to generate a delivery report, which is then sent to intermediary 714.

In step 948, intermediary 714 receives the delivery report from locker manager 713, and forwards the delivery message to seller 718. The delivery report may include information indicating that that the package was delivered and deposited in locker compartment 716, identification information of the digital locker that contains locker compartment 716, identification of the package, identification of a recipient of the package, and the like.

Upon receiving the delivery report, seller 718 becomes aware of the fact that the package whether the package was successfully delivered to locker compartment 716, or whether the package was not delivered to locker compartment 716.

7.0 Weight-Based-Verification of Package Retrieval

In an embodiment, a measurement system implemented in a digital locker is used to determine whether a package was retrieved from a locker compartment. For example, if a weight reading, determined by a locker sensor of the digital locker, changes from a non-zero value to about zero (within a certain tolerance), then the digital locker may determine that an item deposited in the locker compartment has been removed (or retrieved) from the compartment. Examples of weight-based0verification of package retrieval are described in FIG. 13

8.0 Weight-Based-Management of a Locker Usage

Weight readings may also be used to determine the time period during which a package remains in a locker compartment, and/or to determine whether the package remains in a locker compartment longer than it is expected. For example, if a weight of an item deposited in a locker compartment remains above a certain weight threshold for several days, and does not change within the several days by more than 10% of the initial weight of the package, then a digital locker delivery system may generate a message indicating that the package has not been timely retrieved from the compartment. The message may be used as a reminder to urge a recipient of the package to retrieve the package from the locker.

Furthermore, if a package remains in a locker compartment for less than a certain time period, then a sender and/or a recipient of the package may be awarded for using the compartment for a short period of time, and thus increasing the efficiency of the digital locker delivery system. The award may include sweepstakes, coupons, merchandise discounts, service discounts, and the like. However, if a package remains in the compartment longer than a certain time period, then the digital locker deliver system may determine disincentives for the sender and/or the recipient of the package for using the compartment for a long period of time, and thus decreasing efficiency of the digital locker delivery system. Examples of such disincentives may include increasing the cost of renting digital lockers, limiting a pool of locker compartments available to a sender, and the like.

9.0 Retrieving Package from a Digital Locker

In an embodiment, a digital locker sends to a sender or a seller of the package a delivery report. The report may identify a locker compartment in which the package has been deposited. For example, the report may indicate a locker compartment identifier, a location and an access code. Upon receiving the report, the sender (seller) may send a message to a recipient of the package to inform him that the package has been delivered to the digital locker. In the message, the seller may identify the location of the digital locker, the access code for the digital locker, and instructions for picking up the package.

Alternatively, the sender (seller) may send a message to an intermediary, and ask the intermediary to notify the recipient of the package that the package is ready to be picked up from the digital locker. Upon receiving the message, the intermediary may contact the recipient (buyer) and provide the locker compartment identifier/location/access code to the recipient (buyer). Alternatively, the sender (seller) himself may contact the recipient (buyer) and provide the locker compartment identifier/location/access code.

9.1 Flow Chart

Figure 12:
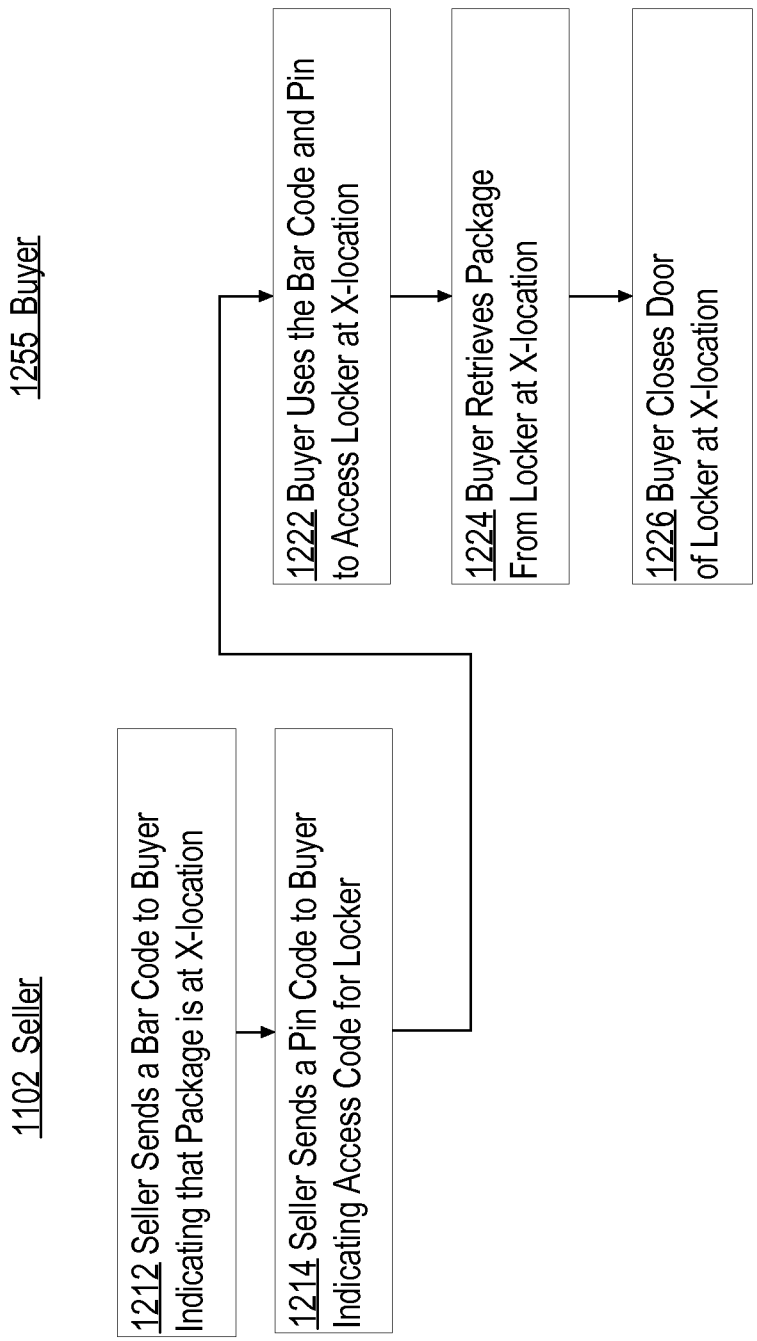
FIG. 12 is a flow diagram that depicts an approach for retrieving a package from a digital locker.

FIG. 12 is a flow diagram that depicts an approach for retrieving a package from a digital locker. The depicted example illustrates interactions between a seller 1102 and a buyer 1255. For the purpose of explaining the example depicted in FIG. 12, it is assumed that the package has been already stored in a digital locker, and the information about the digital locker and the access code to access the digital locker have been provided to seller 1102.

In step 1212, seller 1102 sends information about the package to buyer 1255. The information may be encoded in a bar code, and the information may be emailed, texted or otherwise provided to buyer 1255. The information may include the location information of the digital locker in which the package was deposited. For example, the location information may indicate the address of a digital locker facility and the identifier of the digital locker in the facility.

In an embodiment, the information sent in step 1212 does not contain an access code to access the digital locker in which the package has been deposited. In such a situation, the access code is sent to buyer 1255 separately from the information identifying the location of the digital locker.

In step 1214, seller 1102 sends an access code for the digital locker to buyer 1255. The access code may be used by buyer 1255 to open up the digital locker to retrieve the package from the locker. The access code may be pin number, and alpha-numerical string, or other data that buyer 1255 may use to open up the digital locker.

In step 1222, buyer 1255 uses the location information of the digital locker to locate the digital locker, and uses the access code for the digital locker to open up the locker. The access code may be entered to the digital locker using a touch panel described in FIG. 3-4. The access code may also be entered to the digital locker using any other user interface provided by the digital locker.

If the access code was entered incorrectly to the digital locker, or if the access code was incorrect, then the digital locker will not open the door, and buyer 1255 will not be able to retrieve the package. In addition, the digital locker may display an error message on a touch screen indicating the reason for the access failure. Furthermore, the digital locker may generate and send a message to seller 1102 and/or an intermediary indicating that someone was trying to open up the digital locker, but the attempt was unsuccessful.

However, if the access code is correct and it was correctly entered to the digital locker, then the digital locker will open up the door and buyer 1255 may retrieve the package from a compartment of the digital locker.

In step 1224, buyer 1255 retrieves the package from a compartment of the digital locker. Once buyer 1255 retrieves the package, a sensor of the digital locker may detect that the weight of the compartment (or the content in the compartment) has changed, and report the weight change to a locker controller of the digital locker. Then, the locker controller may report the weight change to a locker manager, as it is described in FIG. 11.

In step 1226, buyer 1255 closes the door of the digital locker. Once buyer 1255 closes the door of the locker, a locker sensor of the digital locker detects that the door has been closed, and report the closing of the door to a locker controller, as it is described in FIG. 11.

9.2 Time Chart

Figure 13:
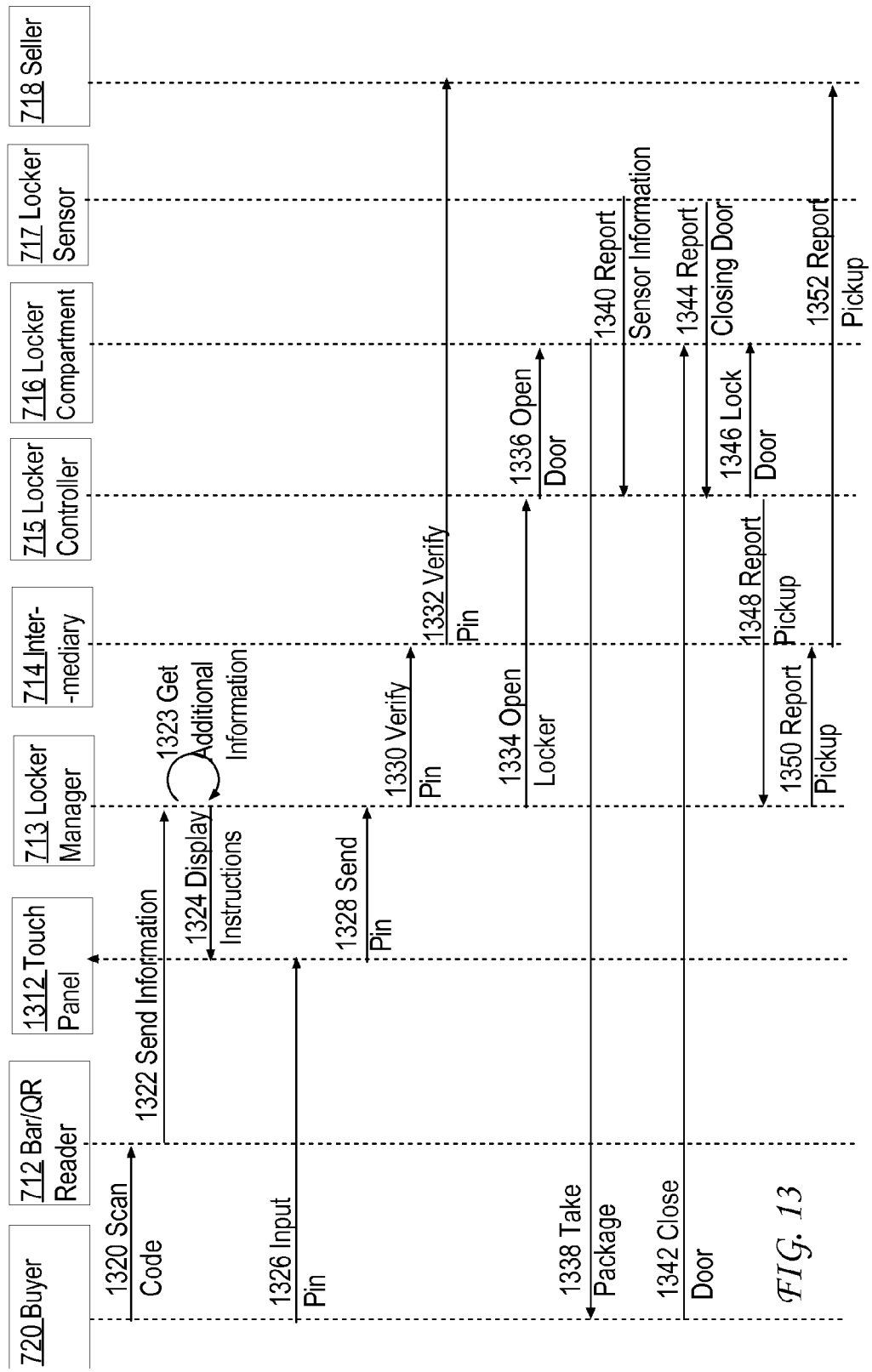
FIG. 13 is a time-chart that depicts an approach for retrieving a package from a digital locker.
Figure 14:
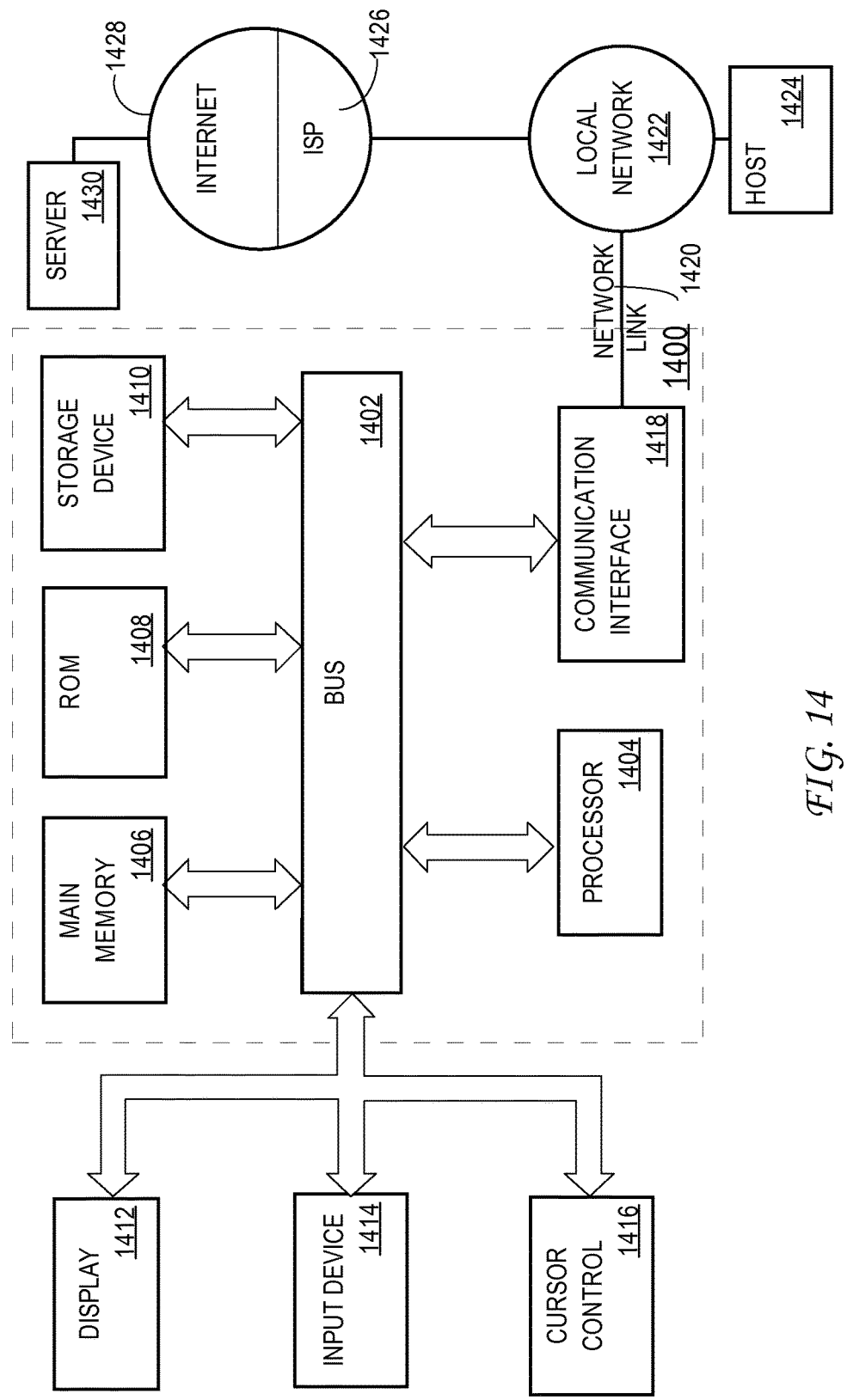
FIG. 14 is a block diagram that depicts a computer system upon which an embodiment may be implemented.

FIG. 13 is a time-chart that depicts an approach for retrieving a package from a digital locker. In the depicted time chart, the communications are exchanged between a buyer 720, a bar/QR code reader 712, a touch panel 1312, a locker manager 713, an intermediary 714, a locker controller 715, a locker compartment 716, a locker sensor 717, and a seller 718.

The example depicted in FIG. 13 is one of many examples of the communications exchanged between entities and elements 710-720 as a package is retrieved from a digital locker. In other examples, the communications may be exchanged between some of the entities and elements 710-720, but not all of them. In yet other examples, communications other than those depicted in FIG. 13 may be exchanged between the entities and elements 710-720.

In the example, depicted in FIG. 13, it is assumed that a buyer 720 received information about the package. For example, buyer 720 may receive the information about the location of the package, an identifier of the digital locker in which the package was deposited, and instructions regarding retrieving the package from the digital locker. The information may be provided to buyer 720 via email, a text, or any other form. For example, buyer may receive a text message containing a bar code having the information encoded in the bar code.

In step 1320, buyer 720 places the bar code in front of a code reader installed in a digital locker. For example, buyer 720 may place the bar code in front of an optical scanner, a bar code reader, or a QR code reader, such as those described in FIG. 3-4.

In step 1322, bar/QR code reader 712 scans the bar code, decodes the bar code, and sends the decoded data to locker manager 713. The decoded data may include instructions for retrieving the package from the digital locker. For example, the instructions may indicate an identifier of the digital locker in which the package is deposited.

In step 1323, locker manager 713 uses the decoded data to obtain additional information about retrieving of the package. This step is optional. For example, in some situations, locker manager 713 may verify whether buyer 720 is authorized to access the digital locker, and/or whether buyer 720 is authorized to retrieve the package from the digital locker. Furthermore, locker manager 713 may determine the time at which buyer 720 arrived at the digital locker, and communicate the time reading to seller 718 or other entity. The time reading may be used to determine the time period during which the package remained in a compartment of the digital locker.

In step 1324, locker manager 713 displays instructions on touch panel 1312 of the digital locker. The instructions may include the identifier of the digital locker in which the package has been deposited, and how buyer 720 may retrieve the package.

An access code may be provided to a user using a variety of ways. In an embodiment, the instructions may provide an access code for the digital locker. The access code may be a pin, or any other code that buyer 720 may use open the digital locker.

In an embodiment, buyer 720 receives an access code in a separate communication from seller 718 and/or intermediary 714. For example, the access code may be provided to buyer 720 as a QR code and may be sent to buyer 720 as a text.

In step 1326, buyer 720 inputs the access code to touch panel 1312 of the digital locker. For example, buyer 720 may use touch panel 1312 to key-in the access pin to the digital locker. Alternatively, buyer 720 may display the access code in front of bar/QR reader 712, and bar/QR code reader 712 may provide the decoded pin to locker manager 713.

In step 1328, touch panel 1312 sends the access pin for opening the digital locker to locker manager 713.

In step 1330, locker manager 713 receives the access pin, and determines whether the access pin is valid. For example, locker manager 713 may check whether the received access pin corresponds to any digital locker that locker manager 713 manages.

In some situations, the received access pin may not be associated with any digital locker that locker manager 713 manages. For example, buyer 720 may have received a valid pin number; however, buyer 720 did not enter the pin number correctly to the digital locker. Also, it may happen that buyer 720 did receive an incorrect pin number, and thus the pin number entered to the digital locker may not cause the door of the locker to open.

Also in step 1330, locker manager 713 may send the received access pin to intermediary 714 with a request to verify whether the pin is correct and/or whether buyer 720 is authorized to use the received access pin.

In step 1332, intermediary 714 receives a request to verify the access pin. Intermediary 714 may try to verify the access pin by checking whether intermediary 714 has any record of distributing the access pin to buyer 720. Alternatively, intermediary 714 may send a request to verify the access pin to seller 718.

Assuming that the access pin is valid and can be used to open the digital locker, in step 1334, locker manager 713 sends a signal to locker controller 715 to open the door of the digital locker.

In step 1336, locker controller receives the signal to open the door of the digital locker, and causes the opening of the door of the locker.

In step 1338, buyer 720 retrieves the package from the digital locker. Once the package is retrieved from the locker, locker sensor 717, in step 1340, detects that the weight of the locker compartment has changed, and obtains a reading of the weight of the compartment. Then, locker sensor 717 sends the weight reading to locker controller 715.

Upon receiving the weight reading from locker sensor 717, locker controller 715 may determine whether the weight reading indeed indicates a zero weight (within a certain tolerance). If so, then locker controller 715 may generate a message and send the message to seller 718 to inform seller 718 that the package was retrieved from the digital locker.

In step 1342, buyer 720 closes the door of the digital locker.

In step 1344, locker sensor 717 detects that the door of the compartment of the digital locker has been closed, and reports the closing of the door to locker controller 715.

In step 1346, locker controller 715 receives the indication from locker sensor 717 that the door of the locker compartment 716 has been closed, and causes locking of the locker compartment. Various ways of initiating the locking of the locker compartment are described in FIG. 6.

In step 1348, locker controller 715 reports a pickup of the package from the digital locker to locker manager 713. For example, locker controller 715 may send a message to locker manager 713 indicating an identifier of the digital locker, the timestamp of the time at which the package was retrieved from the digital locker, and other information.

In step 1350, locker manager 713 reports picking up of the package from the digital locker to intermediary 714. For example, locker manager 713 may send a message to intermediary 714 indicating an identifier of the digital locker, the timestamp of the time at which the package was retrieved from the digital locker, and other information.

In step 1352, intermediary 714 reports picking up of the package from the digital locker to seller 718. For example, intermediary 714 may send a message to seller 718 indicating an identifier of the digital locker, the timestamp of the time at which the package was retrieved from the digital locker, and other information.

In an embodiment, seller 718 may be informed of various steps performed by buyer 720 as the buyer retrieves the package from the digital locker. For example, seller 718 may receive a request to verify an access pin that buyer 720 tries to use to open a locker compartment of the digital locker to retrieve the package from the compartment. The request may be sent from an intermediary 714, as it is depicted in FIG. 13, or from other entity. For example. Seller 718 may receive the request to verify the access pin from locker manager 713 if the locker manager can retrieve the contact information to seller 718.

Seller 718 may also receive indications that a locker compartment became empty. For example, seller 718 may receive a message from intermediary 714 or locker manager 713 if they were informed that the weight of the locker compartment changed from a non-zero weight to a zero weight.

Seller 718 may also receive a report that the package was picked up from the digital locker. The report may be received from intermediary 714, and may indicate to seller 718 that the package was indeed retrieved from the locker compartment, and may indicate the time at which the packet was retrieved from the compartment. For example, seller 718 may receive the report containing an identification of the digital locker, and a timestamp indicating the time at which buyer 720 picked up the package.

Although an access pin number has been described here as a medium for enabling access to the digital locker, alternative systems may use other methods of facilitating access to the locker. For example, buyer 720 may be identified using a face recognition system or a finger papillary lines recognition application, and access to the digital locker may be facilitated using a mobile phone. For instance, buyer 720 may launch a mobile application on his mobile phone, and use the Bluetooth wireless technology and the mobile application to send data to the digital locker and to receive data from the digital locker.

In an embodiment, the approach selects the best-fit digital locker for storing a package. The best-fit locker may be selected as the locker that is large enough to hold the package, but if several lockers are large enough to hold the package, then the smallest of them may be selected as the best-fit digital locker.

Finding the best-fit locker for a package may be implemented by using a variety of sensors, including optical sensors, mechanical sensors, infra-red sensors, and the like. The sensors may determine the measurements of the package, as well as the weight of the package. Using the best-fit-locker approach may improve the utilization of the digital lockers and improve the management of the lockers.

In an embodiment, the approach uses sensors to detect whether a package was delivered to a digital locker, whether a package was retrieved from a digital locker, how long the package remained in a digital locker before the package was retrieved from the locker, and the like. The sensors may be configured to determine various characteristics of the objects placed in the digital locker, including the weight and measurements of the objects. Reports generated by locker sensors may include readings of the weight and measurements of the object stored in the locker.

Using the weight measurements to determine whether a package is delivered or retrieved from a digital locker is a more accurate approach than the approach based on for example, just optical sensors because the optical sensors are sensitive to dust and other particles obscuring the light. For example, if some dust particles obscure the light measured by an optical sensor in a digital locker, then the optical sensor may obtain a reading indicating that some object is present in the digital locker even if the locker is empty.

In contrast, a weight-sensor may provide readings of the weight of the content of the locker that indicate the presence or the absence of an object in the digital locker with a better accuracy than an optical locker can provide.

10.0 Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the disclosure may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. An apparatus comprising:
    a locker manager configured to:
        receive a request to store an item at a locker facility;
        determine a first plurality of locker compartments that are available for storing items at a first locker facility, wherein each locker compartment, from the first plurality of locker compartments that are available for storing items at the first locker facility, has locker-physical-dimensions;
        receive encoded sensor data that specifies item-physical-dimensions of the item and a weight of the item;
        determine whether, based at least in part on the item-physical dimensions of the item and locker-physical-dimensions of each locker compartment from the first plurality of locker compartments that are available for storing items, one or more first locker compartments from the first plurality of locker compartments that are available for storing items that have locker-physical-dimensions that are the same as or greater than the item-physical dimensions of the item;
        in response to determining, based at least in part on the item-physical dimensions of the item and the locker-physical-dimensions of each locker compartment from the first plurality of locker compartments that are available for storing items, that one or more first locker compartments have first locker-physical-dimensions that are the same as or greater than the item-physical dimensions of the item:
            select a first locker compartment from the one or more first locker compartments that have locker-physical-dimensions that are the same as or greater than the item-physical dimensions of the item;
            determine a first locker identifier of the first locker compartment from the one or more first locker compartments that have first locker-physical-dimensions that are the same as or greater than the item-physical dimensions of the item;
            generate and transmit a first response message, which includes the first locker identifier of the first locker compartment;
            receive an item weight from a locker sensor located in the first locker compartment;
            determine whether the item weight, received from the locker sensor located in the first locker compartment, matches the weight, of the item, specified in the encoded sensor data; and
            in response to determining that the item weight, received from the locker sensor located in the first locker compartment, does not match the weight of the item specified in the encoded sensor data, provide an indication that the item weight, received from the locker sensor located in the first locker compartment, does not match the weight, of the item, specified in the encoded sensor data;
            in response to determining that the item weight, received from the locker sensor located in the first locker compartment, matches the weight of the item specified in the encoded sensor data:
                receive, during a predetermined period of time, a plurality of weight readings from the locker sensor located in the first locker compartment;
                determine whether any weight reading, from the plurality of weight readings, is above a threshold weight value and for the predetermined period of time;
                in response to determining that a weight reading, from the plurality of weight readings, is above the threshold weight value and for the predetermined period of time, generate a message indicating that the item has not been retrieved from the first locker compartment during the predetermined period of time.

2. The apparatus of claim 1, wherein the locker manager is further configured to select the first locker compartment from the one or more first locker compartments that have locker-physical-dimensions that are the same as or greater than the item-physical dimensions of the item by determining that the first locker compartment is the smallest locker compartment from the one or more first locker compartments that have locker-physical-dimensions that are the same as or greater than the item-physical dimensions of the item.

3. The apparatus of claim 1, wherein first locker manager is further configured to:
in response to determining, based at least in part on the item-physical dimensions of the item and the locker-physical-dimensions of each locker compartment from the plurality of locker compartments that are available for storing items, that no locker compartment from the plurality of locker compartments that are available for storing items has locker-physical-dimensions that are the same as or greater than the item-physical dimensions of the item:
send, to a second locker manager at a second locker facility, an inquiry for a locker compartment that is available for storing the item;
wherein the inquiry sent to the second locker manager comprises the item-physical dimensions of the item; and
wherein sending the inquiry to the second locker manager causes the second locker manager to generate and provide a response to the locker manager.

4. The apparatus of claim 3, wherein the locker manager is further configured to:
determine whether the response is received from the second locker manager; and
in response to determining that the response is received from the second locker manager, determine whether the response includes a second identifier of a second locker compartment.

5. The apparatus of claim 4, wherein the locker manager is further configured to:
in response to determining that the response includes the second identifier of the second locker compartment, generate and transmit a third response message, which includes the second identifier of the second locker compartment.

6. The apparatus of claim 5, wherein the locker manager is further configured to:
in response to determining that the response does not include the second identifier of the second locker compartment, generate and transmit a fourth response message, which indicates that a suitable locker for the item has not been found.

7. The apparatus of claim 1, wherein the locker manager is further configured to:
in response to determining, based at least in part on the item-physical dimensions of the item and the locker-physical-dimensions of each locker compartment from the first plurality of locker compartments that are available for storing items, that no locker compartment from the first plurality of locker compartments that are available for storing items has locker-physical-dimensions that are the same as or greater than the item-physical dimensions of the item:
determine a second plurality of locker compartments that are available for storing items at a second locker facility, wherein each locker compartment, from the second plurality of locker compartments that are available for storing items at the second locker facility, has locker-physical-dimensions;
determine whether, based at least in part on the item-physical dimensions of the item and the locker-physical-dimensions of each locker compartment from the second plurality of locker compartments that are available for storing items, one or more second locker compartments from the second plurality of locker compartments that are available for storing items that have locker-physical-dimensions that are the same as or greater than the item-physical dimensions of the item;
in response to determining, based at least in part on the item-physical dimensions of the item and the locker-physical-dimensions of each locker compartment from the second plurality of locker compartments that are available for storing items, that one or more second locker compartments have second locker-physical-dimensions that are the same as or greater than the item-physical dimensions of the item:
select a second locker compartment from the one or more second locker compartments that have locker-physical-dimensions that are the same as or greater than the item-physical dimensions of the item;
determine a second locker identifier of the second locker compartment from the one or more second locker compartments that have second locker-physical-dimensions that are the same as or greater than the item-physical dimensions of the item; and
generate and transmit a second response message, which includes the second locker identifier of the second locker compartment.

8. A non-transitory computer-readable storage medium storing one or more instructions which, when executed by one or more processors, cause the one or more processors to perform:
receiving a request to store an item at a locker facility;
determining a first plurality of locker compartments that are available for storing items at a first locker facility, wherein each locker compartment, from the first plurality of locker compartments that are available for storing items at the first locker facility, has locker-physical-dimensions;
receiving encoded sensor data that specifies item-physical-dimensions of the item and a weight of the item;
determining whether, based at least in part on the item-physical dimensions of the item and locker-physical-dimensions of each locker compartment from the first plurality of locker compartments that are available for storing items, one or more first locker compartments from the first plurality of locker compartments that are available for storing items that have locker-physical-dimensions that are the same as or greater than the item-physical dimensions of the item;
in response to determining, based at least in part on the item-physical dimensions of the item and the locker-physical-dimensions of each locker compartment from the first plurality of locker compartments that are available for storing items, that one or more first locker compartments have first locker-physical-dimensions that are the same as or greater than the item-physical dimensions of the item:
selecting a first locker compartment from the one or more first locker compartments that have locker-physical-dimensions that are the same as or greater than the item-physical dimensions of the item;
determining a first locker identifier of the first locker compartment from the one or more first locker compartments that have first locker-physical-dimensions that are the same as or greater than the item-physical dimensions of the item;
generating and transmitting a first response message, which includes the first locker identifier of the first locker compartment;

receiving an item weight from a locker sensor located in the first locker compartment;

determining whether the item weight, received from the locker sensor located in the first locker compartment, matches the weight of the item, specified in the encoded sensor data; and in response to determining that the item weight, received from the locker sensor located in the first locker compartment, does not match the weight, of the item, specified in the encoded sensor data, providing an indication that the item weight, received from the locker sensor located in the first locker compartment, does not match the weight, of the item, specified in the encoded sensor data;

in response to determining that the item weight, received from the locker sensor located in the first locker compartment, matches the weight of the item specified in the encoded sensor data:

receiving, during a predetermined period of time, a plurality of weight readings from the locker sensor located in the first locker compartment;

determining whether any weight reading, from the plurality of weight readings, is above a threshold weight value and for the predetermined period of time;

in response to determining that a weight reading, from the plurality of weight readings, is above the threshold weight value and for the predetermined period of time, generating a message indicating that the item has not been retrieved from the first locker compartment during the predetermined period of time.

9. The non-transitory computer-readable storage medium of claim 8, comprising additional instructions which, when executed, cause performance of:

selecting the first locker compartment from the one or more first locker compartments that have locker-physical-dimensions that are the same as or greater than the item-physical dimensions of the item by determining that the first locker compartment is the smallest locker compartment from the one or more first locker compartments that have locker-physical-dimensions that are the same as or greater than the item-physical dimensions of the item.

10. The non-transitory computer-readable storage medium of claim 8, comprising additional instructions which, when executed, cause performance of:

in response to determining, based at least in part on the item-physical dimensions of the item and the locker-physical-dimensions of each locker compartment from the plurality of locker compartments that are available for storing items, that no locker compartment from the plurality of locker compartments that are available for storing items has locker-physical-dimensions that are the same as or greater than the item-physical dimensions of the item:

sending, to a second locker manager at a second locker facility, an inquiry for a locker compartment that is available for storing the item;

wherein the inquiry sent to the second locker manager comprises the item-physical dimensions of the item; and wherein sending the inquiry to the second locker manager causes the second locker manager to generate and provide a response to the locker manager.

11. The non-transitory computer-readable storage medium of claim 10, comprising additional instructions which, when executed, cause performance of:

determining whether the response is received from the second locker manager; and in response to determining that the response is received from the second locker manager, determining whether the response includes a second identifier of a second locker compartment.

12. The non-transitory computer-readable storage medium of claim 11, comprising additional instructions which, when executed, cause performance of:

in response to determining that the response includes the second identifier of the second locker compartment, generating and transmitting a third response message, which includes the second identifier of the second locker compartment.

13. The non-transitory computer-readable storage medium of claim 12, comprising additional instructions which, when executed, cause performance of:

in response to determining that the response does not include the second identifier of the second locker compartment, generating and transmitting a fourth response message, which indicates that a suitable locker for the item has not been found.

14. The non-transitory computer-readable storage medium of claim 8, comprising additional instructions which, when executed, cause performance of:

in response to determining, based at least in part on the item-physical dimensions of the item and the locker-physical-dimensions of each locker compartment from the first plurality of locker compartments that are available for storing items, that no locker compartment from the first plurality of locker compartments that are available for storing items has locker-physical-dimensions that are the same as or greater than the item-physical dimensions of the item:

determining a second plurality of locker compartments that are available for storing items at a second locker facility, wherein each locker compartment, from the second plurality of locker compartments that are available for storing items at the second locker facility, has locker-physical-dimensions;

determining whether, based at least in part on the item-physical dimensions of the item and the locker-physical-dimensions of each locker compartment from the second plurality of locker compartments that are available for storing items, one or more second locker compartments from the second plurality of locker compartments that are available for storing items that have locker-physical-dimensions that are the same as or greater than the item-physical dimensions of the item;

in response to determining, based at least in part on the item-physical dimensions of the item and the locker-physical-dimensions of each locker compartment from the second plurality of locker compartments that are available for storing items, that one or more second locker compartments have second locker-physical-dimensions that are the same as or greater than the item-physical dimensions of the item:

selecting a second locker compartment from the one or more second locker compartments that have locker-physical-dimensions that are the same as or greater than the item-physical dimensions of the item;

determining a second locker identifier of the second locker compartment from the one or more second locker compartments that have second locker-physical-dimensions that are the same as or greater than the item-physical dimensions of the item; and generating and transmitting a second response message, which includes the second locker identifier of the second locker compartment.

15. A method comprising:

receiving a request to store an item at a locker facility;

determining a first plurality of locker compartments that are available for storing items at a first locker facility, wherein each locker compartment, from the first plurality of locker compartments that are available for storing items at the first locker facility, has locker-physical-dimensions;

receiving encoded sensor data that specifies item-physical-dimensions of the item and a weight of the item;

determining whether, based at least in part on the item-physical dimensions of the item and locker-physical-dimensions of each locker compartment from the first plurality of locker compartments that are available for storing items, one or more first locker compartments from the first plurality of locker compartments that are available for storing items that have locker-physical-dimensions that are the same as or greater than the item-physical dimensions of the item;

in response to determining, based at least in part on the item-physical dimensions of the item and the locker-physical-dimensions of each locker compartment from the first plurality of locker compartments that are available for storing items, that one or more first locker compartments have first locker-physical-dimensions that are the same as or greater than the item-physical dimensions of the item:

selecting a first locker compartment from the one or more first locker compartments that have locker-physical-dimensions that are the same as or greater than the item-physical dimensions of the item;

determining a first locker identifier of the first locker compartment from the one or more first locker compartments that have first locker-physical-dimensions that are the same as or greater than the item-physical dimensions of the item;

generating and transmitting a first response message, which includes the first locker identifier of the first locker compartment;

receiving an item weight from a locker sensor located in the first locker compartment;

determining whether the item weight, received from the locker sensor located in the first locker compartment, matches the weight, of the item, specified in the encoded sensor data; and in response to determining that the item weight, received from the locker sensor located in the first locker compartment, does not match the weight, of the item, specified in the encoded sensor data, providing an indication that the item weight, received from the locker sensor located in the first locker compartment, does not match the weight, of the item, specified in the encoded sensor data;

in response to determining that the item weight, received from the locker sensor located in the first locker compartment, matches the weight of the item specified in the encoded sensor data:

receiving, during a predetermined period of time, a plurality of weight readings from the locker sensor located in the first locker compartment;

determining whether any weight reading, from the plurality of weight readings, is above a threshold weight value and for the predetermined period of time;

in response to determining that a weight reading, from the plurality of weight readings, is above the threshold weight value and for the predetermined period of time, generating a message indicating that the item has not been retrieved from the first locker compartment during the predetermined period of time;

wherein the method is performed using one or more computing devices.

16. The method of claim 15, further comprising:

selecting the first locker compartment from the one or more first locker compartments that have locker-physical-dimensions that are the same as or greater than the item-physical dimensions of the item by determining that the first locker compartment is the smallest locker compartment from the one or more first locker compartments that have locker-physical-dimensions that are the same as or greater than the item-physical dimensions of the item.

17. The method of claim 15, further comprising:

in response to determining, based at least in part on the item-physical dimensions of the item and the locker-physical-dimensions of each locker compartment from the plurality of locker compartments that are available for storing items, that no locker compartment from the plurality of locker compartments that are available for storing items has locker-physical-dimensions that are the same as or greater than the item-physical dimensions of the item:

sending, to a second locker manager at a second locker facility, an inquiry for a locker compartment that is available for storing the item;

wherein the inquiry sent to the second locker manager comprises the item-physical dimensions of the item; and wherein sending the inquiry to the second locker manager causes the second locker manager to generate and provide a response to the locker manager.

18. The method of claim 17, further comprising:

determining whether the response is received from the second locker manager; and in response to determining that the response is received from the second locker manager, determining whether the response includes a second identifier of a second locker compartment.

19. The method of claim 18, further comprising:

in response to determining that the response includes the second identifier of the second locker compartment, generating and transmitting a third response message, which includes the second identifier of the second locker compartment.

20. The method of claim 15, further comprising:

in response to determining, based at least in part on the item-physical dimensions of the item and the locker-physical-dimensions of each locker compartment from the first plurality of locker compartments that are available for storing items, that no locker compartment from the first plurality of locker compartments that are available for storing items has locker-physical-dimensions that are the same as or greater than the item-physical dimensions of the item:

determining a second plurality of locker compartments that are available for storing items at a second locker facility, wherein each locker compartment, from the second plurality of locker compartments that are available for storing items at the second locker facility, has locker-physical-dimensions;

determining whether, based at least in part on the item-physical dimensions of the item and the locker-physical-dimensions of each locker compartment from the second plurality of locker compartments that are available for storing items, one or more second locker compartments from the second plurality of locker compartments that are available for storing items that have locker-physical-dimensions that are the same as or greater than the item-physical dimensions of the item;

in response to determining, based at least in part on the item-physical dimensions of the item and the locker-physical-dimensions of each locker compartment from the second plurality of locker compartments that are available for storing items, that one or more second locker compartments have second locker-physical-dimensions that are the same as or greater than the item-physical dimensions of the item:

selecting a second locker compartment from the one or more second locker compartments that have locker-physical-dimensions that are the same as or greater than the item-physical dimensions of the item;

determining a second locker identifier of the second locker compartment from the one or more second locker compartments that have second locker-physical-dimensions that are the same as or greater than the item-physical dimensions of the item; and generating and transmitting a second response message, which includes the second locker identifier of the second locker compartment.

\* \* \* \* \*